United States Patent
Handte et al.

(10) Patent No.: US 12,542,578 B2
(45) Date of Patent: Feb. 3, 2026

(54) MULTI-ACCESS POINT COMMUNICATION DEVICES AND METHODS FOR COORDINATED JOIN TRANSMISSION WITH REDUCED BACKHAUL REQUIREMENTS

(71) Applicant: Sony Group Corporation, Tokyo (JP)

(72) Inventors: Thomas Handte, Stuttgart (DE); Dana Ciochina, Stuttgart (DE)

(73) Assignee: Sony Group Corporation, Tokyo (JP)

(*) Notice: Subject to any disclaimer, the term of this patent is extended or adjusted under 35 U.S.C. 154(b) by 480 days.

(21) Appl. No.: 17/771,028

(22) PCT Filed: Oct. 29, 2020

(86) PCT No.: PCT/EP2020/080400
§ 371 (c)(1),
(2) Date: Apr. 22, 2022

(87) PCT Pub. No.: WO2021/084010
PCT Pub. Date: May 6, 2021

(65) Prior Publication Data
US 2022/0271800 A1    Aug. 25, 2022

(30) Foreign Application Priority Data
Oct. 31, 2019   (EP) ..................... 19206564

(51) Int. Cl.
*H04B 7/024*      (2017.01)
*H04B 7/0452*     (2017.01)
*H04B 7/06*       (2006.01)
*H04W 80/02*      (2009.01)

(52) U.S. Cl.
CPC .......... *H04B 7/024* (2013.01); *H04B 7/0452* (2013.01); *H04B 7/0671* (2013.01); *H04W 80/02* (2013.01)

(58) Field of Classification Search
CPC .... H04B 7/024; H04B 7/0452; H04B 7/0671; H04W 80/02
See application file for complete search history.

(56) References Cited

U.S. PATENT DOCUMENTS

| 9,397,707 B2 | 7/2016 | Kang et al. |
| 10,009,736 B1 | 6/2018 | Chu |

(Continued)

FOREIGN PATENT DOCUMENTS

| CN | 104270822 A | 1/2015 |
| CN | 105873040 A | 8/2016 |

(Continued)

OTHER PUBLICATIONS

International Search Report and Written Opinion mailed on Dec. 16, 2020, received for PCT Application PCT/EP2020/080400, Filed on Oct. 29, 2020, 11 pages.

(Continued)

*Primary Examiner* — Sulaiman Nooristany

(57) ABSTRACT

The present disclosure presents an efficient backhaul operation that minimizes data rate requirements of the backhaul. Backhaul information is transmitted from a master AP to one or more slave APs for joint transmission from the one or more slave APs to an STA in coordination with a transmission from the master AP to the STA.

14 Claims, 21 Drawing Sheets

(56) References Cited

U.S. PATENT DOCUMENTS

| | | | |
|---|---|---|---|
| 11,641,633 B1* | 5/2023 | Cao | H04W 56/0045 |
| | | | 370/336 |
| 2015/0288427 A1 | 10/2015 | Wang et al. | |
| 2019/0028168 A1 | 1/2019 | Vermani et al. | |
| 2019/0110214 A1* | 4/2019 | Shen | H04W 76/12 |
| 2022/0209825 A1* | 6/2022 | Chitrakar | H04W 76/15 |

FOREIGN PATENT DOCUMENTS

| | | |
|---|---|---|
| JP | 2013511886 A | 4/2013 |
| JP | 2016501465 A | 1/2016 |
| WO | WO-2008157149 A | 12/2008 |
| WO | WO-2021084010 A1 | 5/2021 |

OTHER PUBLICATIONS

IEEE, "Part 11: Wireless LAN Medium Access Control (MAC) and Physical Layer (PHY) Specifications", IEEE Computer Society, IEEE Std 802.11, Dec. 7, 2016, pp. 1-3534.

* cited by examiner

MULTI-ACCESS POINT COMMUNICATION DEVICES AND METHODS FOR COORDINATED JOIN TRANSMISSION WITH REDUCED BACKHAUL REQUIREMENTS

CROSS-REFERENCE TO RELATED APPLICATIONS

The present application is based on PCT filing PCT/EP2020/080400, filed Oct. 29, 2020, which claims priority to EP 19206564.7, filed Oct. 31, 2019, the entire contents of each are incorporated herein by reference.

BACKGROUND

Field of the Disclosure

The present disclosure relates to communication devices and methods, in particular for use in a multi access point (multi-AP) communication system.

Description of Related Art

As of today, in Wireless LANs (WLANs), an access point (AP) transmits one or more PPDUs (physical layer protocol data units) to one or more stations (STAs). Thereby, only a single AP should be transmitting at a point in time. Transmissions by other APs or STAs are interfering with that transmission and are therefore undesired. Next generation Wireless LAN considers joint transmission (JTX) of PPDUs by multiple APs (MAP) at the same time. The advantage is that coverage and/or reception quality can be increased.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly nor impliedly admitted as prior art against the present disclosure.

SUMMARY

It is an object to provide communication devices and methods that enable an efficient multi-AP operation. It is a further object to provide a corresponding computer program and a non-transitory computer-readable recording medium for implementing said methods.

According to an aspect there is provided a first communication device comprising
  MAC layer circuitry configured to
    generate MAC output data units by performing media access control (MAC) layer processing of MAC input data units to be transmitted to a second communication device, and
    generate control information for one or more selected MAC output data units, the control information indicating that the one or more selected MAC output data units are to be physical (PHY) layer processed by the third communication device and to be transmitted to the second communication device from the third communication device and from the first communication device; and
  PHY layer circuitry configured to generate PHY output data units by performing PHY layer processing of the MAC output data units, wherein selected PHY output data units are generated from the selected MAC output data units for transmission to the second communication device from the first communication device in coordination with the transmission of selected PHY output data units generated by the third communication device from the selected MAC output data units,
  wherein the first communication device is configured to provide the one or more selected MAC output data units and the associated control information to the third communication device.

According to a further aspect there is provided a third communication device comprising
  MAC layer circuitry configured to obtain one or more selected media access control (MAC) output data units and associated control information from a first communication device, the control information indicating that the one or more MAC selected output data units are to be physical (PHY) layer processed by the third communication device and to be transmitted to the second communication device from the third communication device and from the first communication device; and
  PHY layer circuitry configured to generate selected PHY output data units by performing PHY layer processing of the selected MAC output data units for transmission to the second communication device from the third communication device in coordination with the transmission of selected PHY output data units generated by the first communication device from selected MAC output data units.

According to still further aspects corresponding methods, a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed communication devices and methods, the disclosed computer program and the disclosed computer-readable recording medium have similar and/or identical further embodiments as the claimed first communication device and as defined in the dependent claims and/or disclosed herein.

One of the aspects of the disclosure is that, in a multi-AP communication setup, the access points (generally called AP STAs or simply APs) require knowledge of the data to be transmitted to a station (generally called non-AP STA or simply STA; also called "second communication device" herein). A backhaul link is thus provided to transport the necessary information to the APs participating in a joint transmission before the actual joint transmission takes place. According to the present disclosure, an efficient backhaul operation is presented that minimizes data rate requirements of the backhaul. In particular, a concept of transferring backhaul information from a master AP (also called "first communication device" herein) to one or more slave APs (also called "third communication device" herein) is disclosed in an embodiment. Furthermore, two concepts of transmit signal construction at the master AP providing this information and the slave AP(s) receiving this information are disclosed in embodiments of the disclosure. The proposed solutions are superior to known concepts in terms of required backhaul data rate and provide seamless integration into IEEE 802.11 compliant communication systems.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

As of today, in any wireless LAN, an access point (AP) transmits one or more PPDUs (physical layer protocol data units) to one or more stations (STAs). Thereby, only a single AP is transmitting at a point in time. Transmissions by other APs or STAs are interfering with that transmission and are therefore undesired.

In contrast, next generation Wireless LAN considers joint transmission (JTX) of a PPDU by multiple APs (MAP) at the same time. The advantage is that coverage and/or reception quality are increased. As a disadvantage, there is a need for synchronization between APs and advanced channel sounding.

A further important aspect for MAP is that information needs to be shared among the APs that transmit simultaneously in MAP setup. The exchange of this information is one of the objectives of this disclosure.

Figure 1:
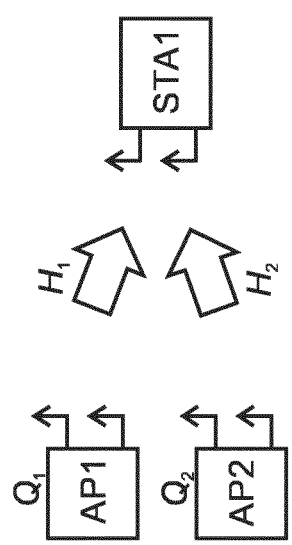
FIG. 1 shows a schematic diagram of a conventional communication system.
Figure 3:
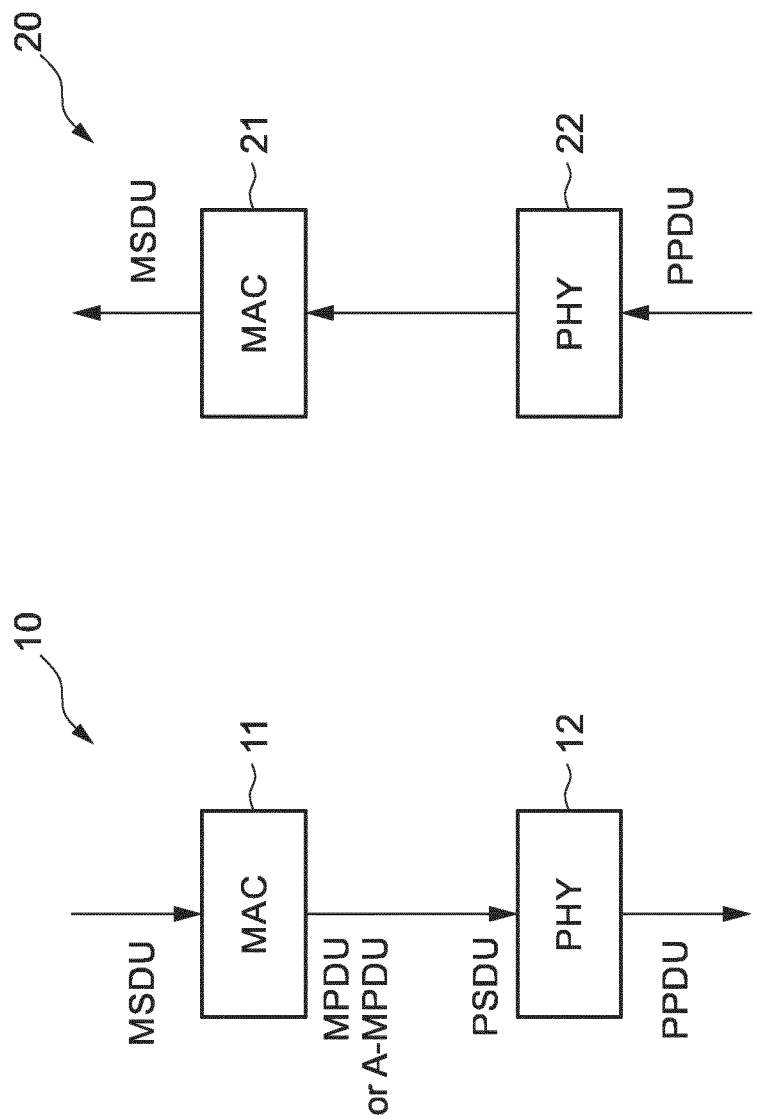
FIG. 3 shows the general layout of a communication device operating as AP and a communication device operating as STA.

In the following, a brief overview of the system model will be given. FIG. 1 shows a system using MAP data transmission from two APs to one STA, i.e. the setup resembles a downlink scenario. Each AP as well as each STA may have multiple transmit or receive antennas, respectively. The channel transfer function from AP1 to STA1 is $H_1$, whereas $H_2$ is the channel transfer function from AP2 to STA1. Note that both $H_1$ and $H_2$ are matrices, which are in the most general case a function of carrier or tone index, i.e. the channel can be modeled by a set of matrices. In addition, both matrices may change with time but this is not considered here, as it is assumed that a channel matrix is known to at least the respective AP with good accuracy.

The receive signal r at STA1 (for a particular carrier or tone) is $$r = [H_1 \ H_2] \cdot \begin{pmatrix} t_1 \\ t_2 \end{pmatrix}$$

in which $t_1$ and $t_2$ denote the actual transmit signal of a respective AP. Each AP may perform a precoding with matrix $Q_1$ or $Q_2$, respectively. Thus, the received signal r is $$r[H_1 Q_1 \ H_2 Q_2] \cdot s$$

with $$Q = \begin{pmatrix} Q_1 \\ Q_2 \end{pmatrix}$$

being the overall precoding matrix and s being the baseband transmit signal before precoding. In the model above, the transmit signal, receive signal, channel matrix, and precoding matrix are carrier-based. An OFDM system is assumed, where each OFDM symbol conveys the information to be transmitted on one or more subcarriers or tones. The transmit signal may consist of one or more OFDM symbols.

In the most general case, vectors has dimensions $N_{SS} \times 1$ with $N_{SS}$ denoting the number of spatial streams in JTX. $Q_i$ has dimensions $N_{TX,i} \times N_{SS}$ with $N_{TX,i}$ denoting the number of transmit chains or transmit antennas of AP i. $H_i$ has dimensions of $N_{RX} \times N_{TX,i}$ with $N_{RX}$ denoting the number of receive antennas of STA1. The model presented here assumes a single receiver; however, it can be easily extended to a multi-user (MU) scenario. In MU context, MAP serves several STAs at the same time.

Figure 2:
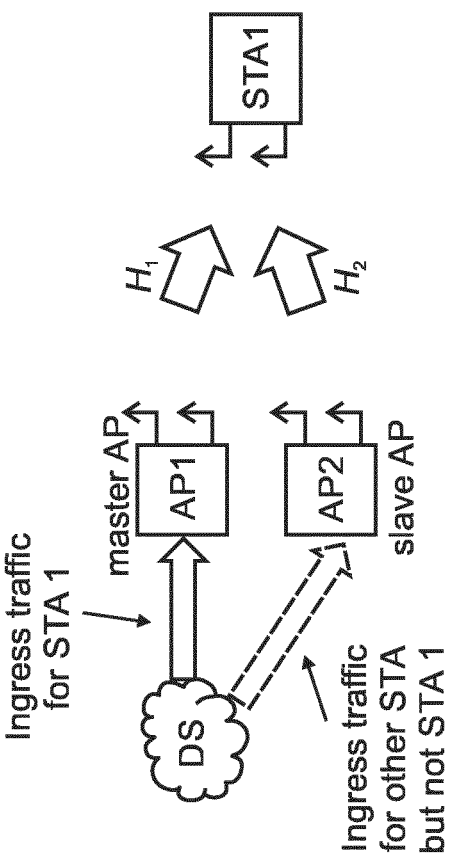
FIG. 2 shows a schematic diagram of another conventional communication system.

In the following, it is assumed that the data traffic ingresses at a single AP as shown in FIG. 2 illustrating a communication system having a master AP (AP1; generally also called first communication device herein) and a slave AP (AP2; generally also called third communication device herein; there may be further slave APs) serving a station (STA1; generally a second communication device). Thus, the (user) data to be transmitted to the STA enters one AP (the master AP) only. All other APs that participate in a JTX are referred to as slave APs. As will be explained in more detail below, backhaul information is transmitted from the master AP to one or more slave APs for joint transmission from the one or more slave APs to a STA in coordination with a transmission from the master AP to the STA.

The distribution system (DS), which may be an external entity, such as a router, a server, a network, etc., is a connection to a higher layer, which provides a source of ingress traffic and a sink for egress traffic from an AP perspective. It is the objective of the DS to deliver a MAC service data unit (MSDU) to the intended destination. The DS may contain wireline and/or even further wireless links. It should be noted that master AP and slave AP provide egress traffic to the DS as well, but this is not primarily addressed in this disclosure.

As can be seen from the equation above, the master AP (e.g. AP1) may generates based on the ingress traffic, but AP2 cannot generate s because it is not aware of the data to be sent to STA1. It is the objective of this disclosure to provide means to convey the necessary information from the master AP to one or more slave APs so that they can generate s.

According to embodiments, two ways to provide the one or more selected MAC output data units and the associated control information to the slave AP(s), namely via wireless backhaul or via DS backhaul, are provided, i.e. the slave APs are connected via a (e.g. wired) link to the master AP or via wireless backhaul (i.e. the slave APs are wirelessly connected to the master AP). The wireless connection may use the same frequency band as the successive JTX or a different frequency band. Moreover, embodiments of how the JTX is initiated or triggered after the necessary information has been conveyed to the slave APs are presented. Generally, embodiments of the proposed solutions are very efficient in terms of required bit rate of the backhaul, because they provide only MAC layer information to the slave AP(s) instead of full PHY layer information.

Before going to the details of MAP, the general operation of WLAN shall be briefly described by reference to showing the general layout of a communication device 10 operating as AP and of a communication device 20 operating as STA. The communication device 10 comprises a MAC (media access control) unit 11 (also called MAC layer unit or MAC layer circuitry or simply MAC layer) and a PHY (physical) unit 12 (also called PHY layer unit or PHY layer circuitry or simply PHY layer). The communication device 20 comprises a MAC unit 21 and a PHY unit 22 as well. All these units may e.g. be implemented by respective circuitry, a processor or computer.

Generally, the MAC unit 11 processes any incoming MSDU (herein also called MAC input data unit) in several steps. The main steps may be as follows. First, the MAC unit 11 buffers an incoming MSDU in one or more queues depending on its priority. Once the wireless channel is free for a certain period of time, the MAC unit 11 starts processing one or more MSDUs: The MAC unit 11 encrypts user data (i.e. one or more MSDU), prepends a MAC header and appends a frame check sequence (FCS). This forms a MPDU (herein also called MAC output data unit). The MAC header contains control information for the MAC unit of the peer STA 20 such as type of frame, duration, source and destination (MAC) address, and sequence number. The FCS is present for the MAC unit 21 of the peer STA 20 to detect if the MSDU or the MAC header has been received in error (and to potentially request a retransmission).

In a next step, one MPDU or several MPDUs are aggregated to an A-MPDU, which forms the physical layer service data unit (PSDU; herein also called PHY input data unit). The MAC unit 11 forwards the PSDU to the PHY unit 12, which encodes, modulates and transmits the MAC message (either MPDU or A-MPDU), i.e. the PSDU. To enable the PHY unit 22 of the peer STA 20 to demodulate a received PHY output data unit, the PHY unit 12 prepends a PHY preamble holding PHY configuration and channel estimation sequences. The finally obtained PPDUs (PHY output data units) are transmitted to the STA 20.

The PHY unit 22 of the STA 20 receives the PPDUs and performs inverse PHY layer processing followed by inverse MAC layer processing by the MAC unit 21 to obtain the MSDUs, i.e. the original data provided to the AP for transmission to the STA.

The PHY unit 12 may combine MPDUs with different destination/receiver address in a (multi-user) MU-PPDU. In this case, orthogonal PHY layer resources such as OFDMA or MU-MIMO perform the separation of PSDUs with different destination/receiver address.

Figure 4:
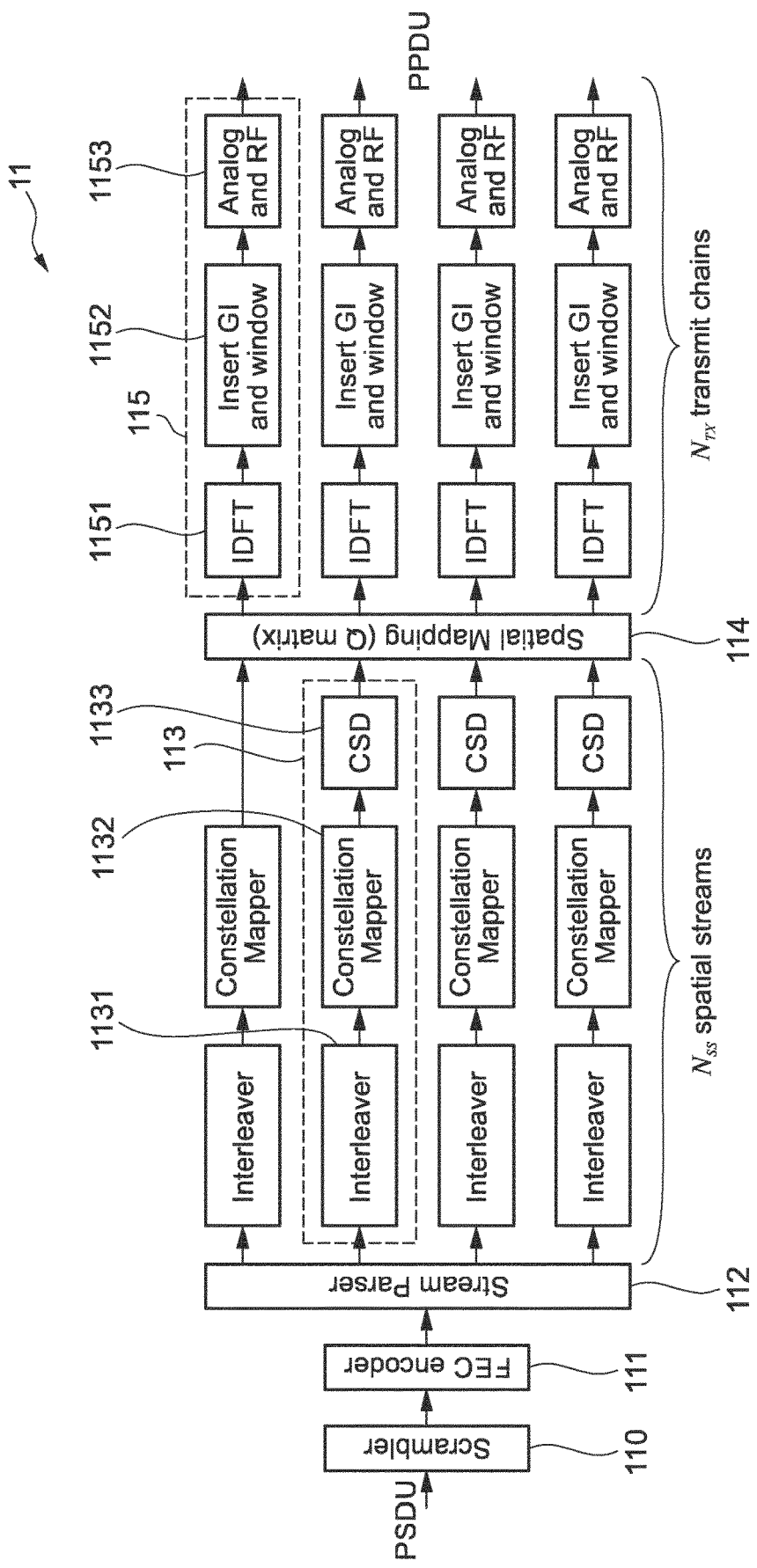
FIG. 4 shows a schematic diagram of an embodiment of a PHY unit of the AP.

FIG. 4 shows a schematic diagram of an embodiment of a PHY unit 11 of the AP 10. It includes a scrambler 110, a forward error correction (FEC) encoder 111, a stream parser 112, $N_{SS}$ spatial stream processing units 113 (each comprising an interleaver 1131, a constellation mapper 1132 and (except for the first stream) a cyclic shift delay (CSD) unit 1133), a spatial mapper 114 and NTX transmit chains 115 (each comprising an inverse discrete Fourier transform (IDFT) unit 1151, an insertion unit 1152 for inserting a guard interval (GI) and window and an analog and RF processing unit 1153). It should be noted that the PHY unit 22 of the STA 20 may generally be configured in the same manner.

Figure 5:
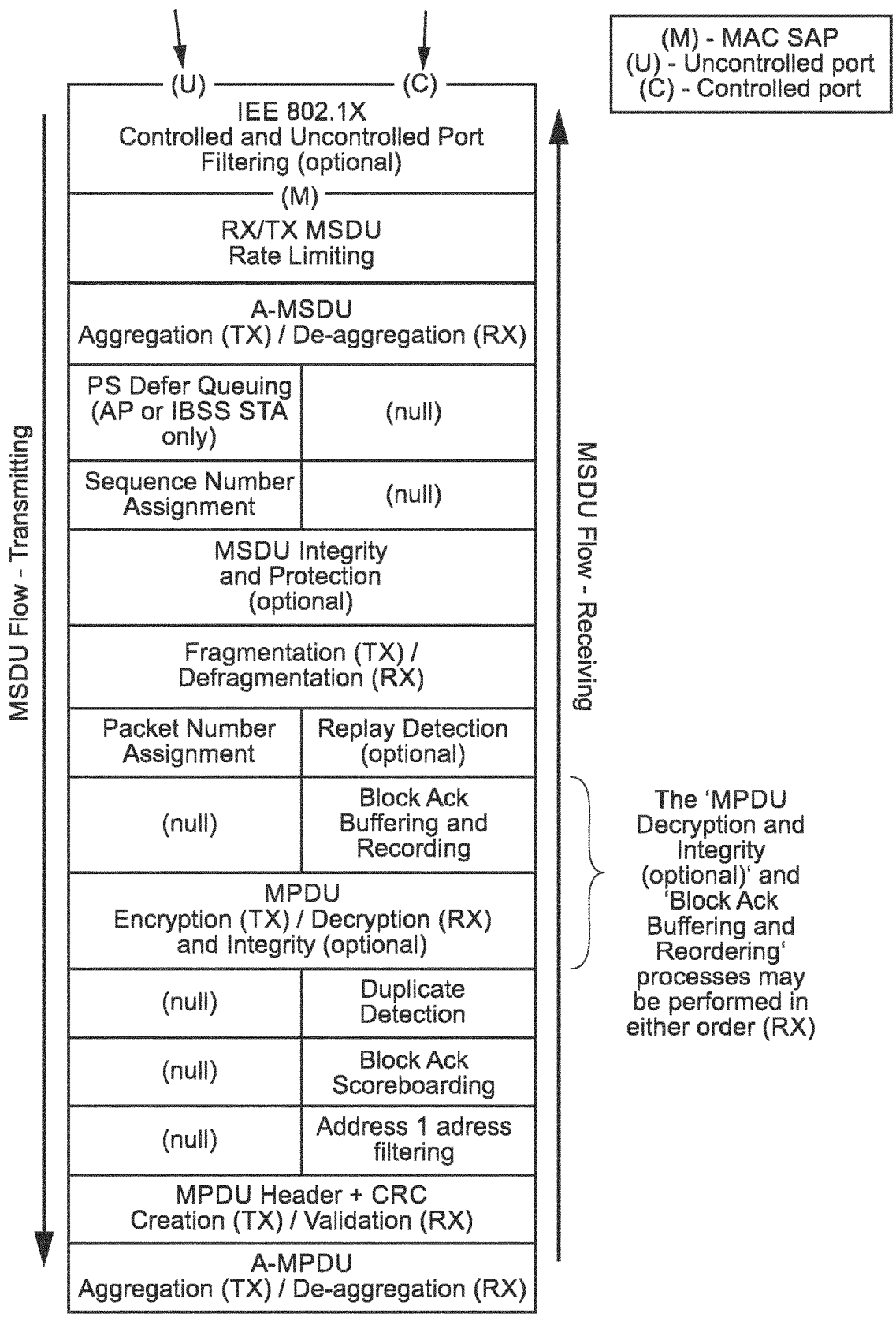
FIG. 5 shows a diagram illustrating MAC operation for transmission and reception.
Figure 6:
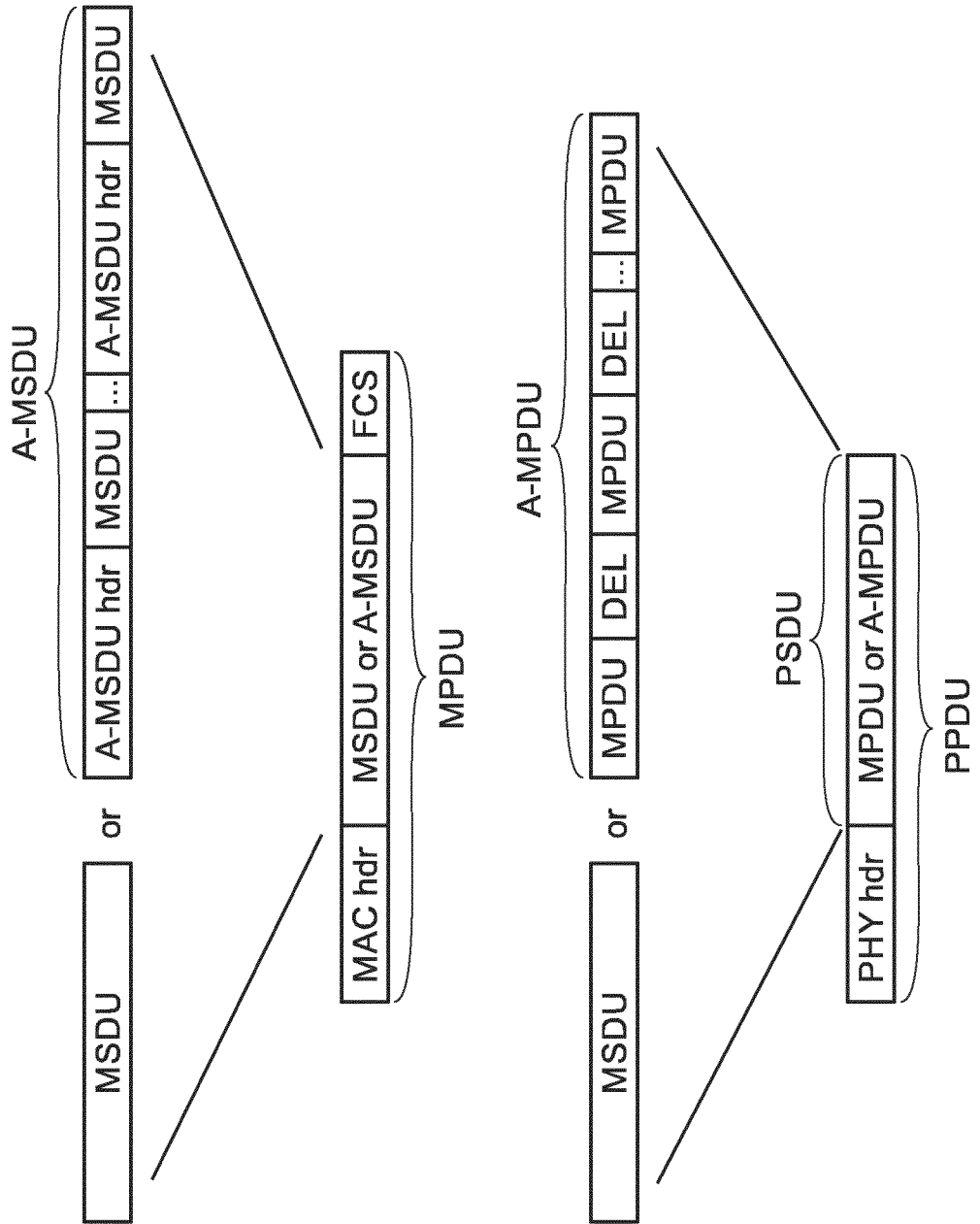
FIG. 6 shows a diagram illustrating the relationships between MSDU, A-MSDU, MPDU, A-MPDU, PSDU and PPDU.

FIG. 5 shows a diagram illustrating MAC operation for transmission and reception. FIG. 6 shows a diagram illustrating the relationships between MSDU, A-MSDU, MPDU, A-MPDU, PSDU and PPDU. Further details of these relationships and the general configuration and operation of MAC and PHY circuitry can e.g. be found in IEEE 802.11 standards. According to the present disclosure the processing of a MSDU is different for MAP for both master AP and slave APs as will be explained below in detail.

Figure 7:
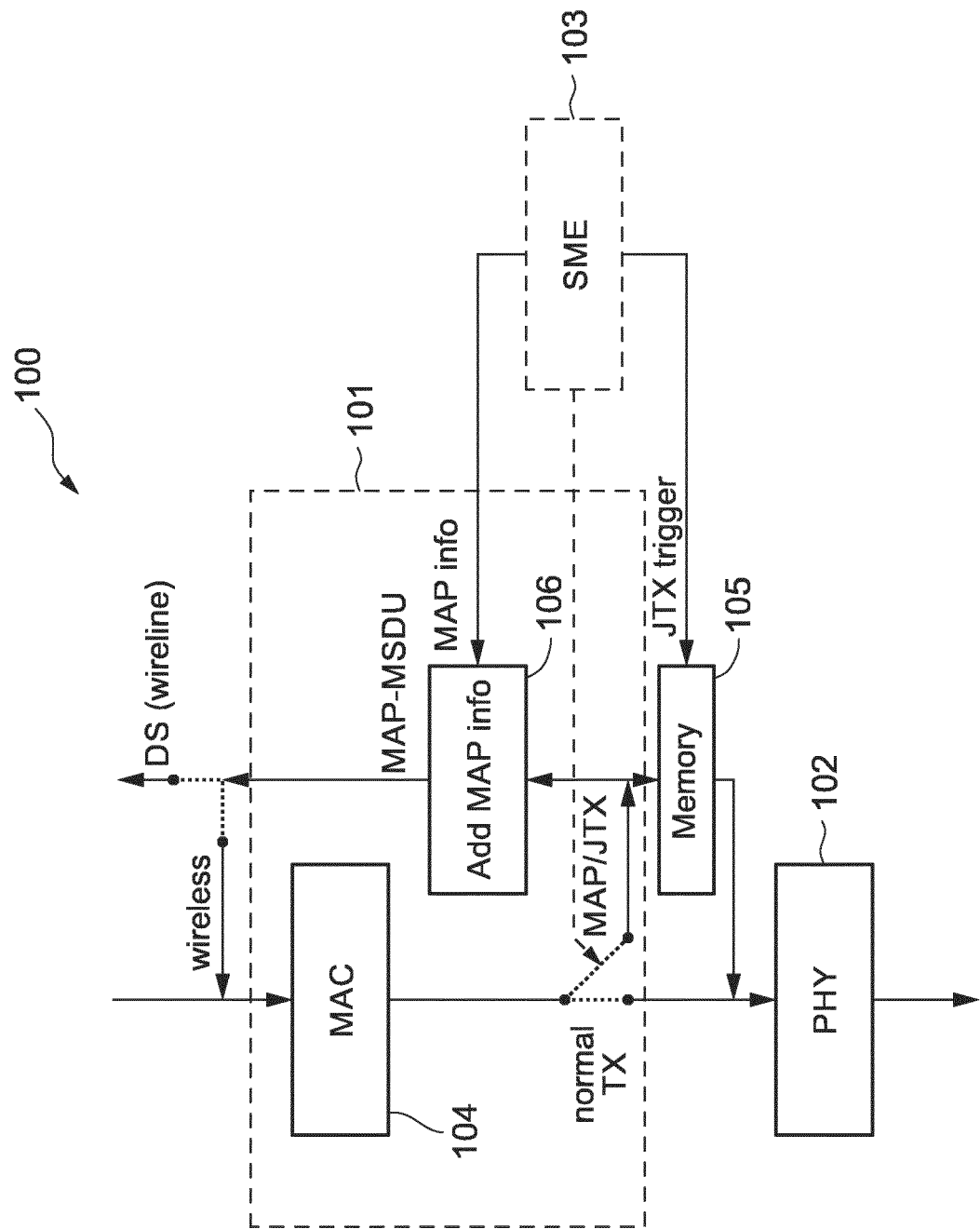
FIG. 7 shows a schematic diagram of a first communication device to illustrate its operation as master AP according to the present disclosure.

FIG. 7 shows a schematic diagram of a first communication device 100 to illustrate its operation as master AP according to the present disclosure. The master AP 100 comprises a MAC unit 101 and a PHY unit 102. Once the master AP 100 receives a MSDU, it checks if that MSDU is MAP eligible, i.e. if it can be transmitted to a particular station both by the master AP and a slave AP in coordination, i.e. in a joint transmission (JTX). A MAP eligible MSDU (also called selected MSDU) thus is a MSDU which is part of a PPDU transmitted by a slave AP in a JTX. This check (or selection) can e.g. be accomplished by evaluating the destination and/or receiver address and/or user priority provided along with the MSDU. The categorization of MAP or non-MAP eligible MSDU may be done by an optional (internal or external) control unit 103 (e.g. station management entity, SME) or by any other entity of the master AP. The categorization may be done before or after MAC processing of MSDUs. If a MSDU is not MAP eligible, regular MAC and PHY processing is done.

It shall be noted that in an embodiment, at an earlier stage, the master AP may determine that joint transmission should be used (e. g. for transmission to one or more or all STAs) and a MAP mode should be entered (e. g. because joint transmission is beneficial regarding improved data rates or reliability). If the master AP is in that MAP mode, the eligibility check as described above may thus comprise or represent the step of selecting MSU that shall be used in a JTX. In another embodiment the step of eligibility check and the selection step may be separate steps performed subsequently.

Figure 8:
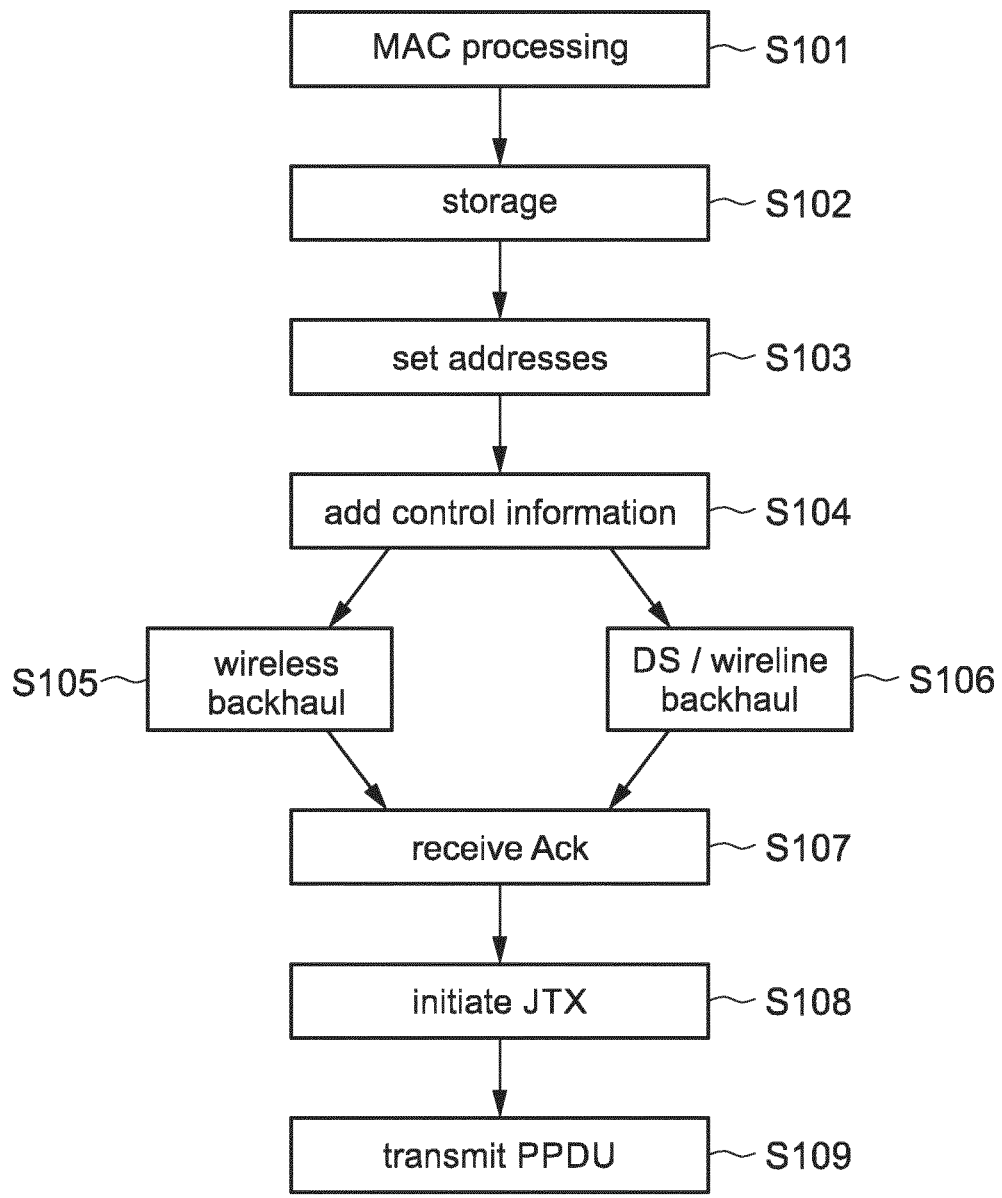
FIG. 8 shows a flowchart of the operation of the MAC unit of the master AP.

If the MSDU is MAP eligible, the MAC unit 101 may perform the following steps illustrated in the flowchart shown in FIG. 8.

Initially, MAC output data units are generated by performing MAC layer processing of MAC input data units to be transmitted to a STA. In particular, in a first step S101, the MAC unit 100 processes the MSDU (MAC input data unit) regularly, i.e. it performs steps such as encryption, MAC header and FCS addition as well as aggregation to an A-MPDU (this is indicated by the block 104 in FIG. 7). The output is either a MPDU or A-MPDU (MAC output data unit). This MAC processing for MAP eligible MSDUs can be done although the channel is busy.

The master AP 100 stores (step S102) the MAC output data units that are selected for later transmission in the joint transmission (also called "selected MAC output data units") in a memory 105 (these are later the PSDU or at least part of it).

Subsequently, control information for one or more selected MAC output data units is generated. The control information indicates that the one or more selected MAC output data units are to be PHY layer processed by slave AP and to be transmitted to the STA from the slave AP and from the master AP.

In particular, in step S103, the MAC unit 101 interprets the selected MAC output data units (i.e. the MPDU or A-MPDU) as a new MSDU (called MAP-MSDU in the following) but sets source and destination address differently: The new source address is the master AP address (i.e. the address of the master AP 100) and the new destination address is the slave AP address (i.e. the address of a slave AP (200 and 300; see FIGS. 10 and 11).

Further, in step S104 the MAC unit 101 adds further control information to that MAP-MSDU, for instance a unique identifier. This can e.g. be another header, a MAP header or a MAP (control) frame. Details will be explained below in more detail. Steps 103 and 104 are performed in the block 106 in FIG. 7. The MAP information ("control information") may be provided by the control unit (e.g. the SME 103). In another embodiment, S103 and S104 may be combined, i.e. the addresses may be set in the control information.

Subsequently, the one or more selected MAC output data units and the associated control information are provided to the slave AP. In an embodiment using wireless backhaul, as provided in step S105, once the channel is free, the MAC unit 101 processes this MAP-MSDU regularly but considers the source-destination (e.g. master AP-slave AP) specific parameters such as MAC (e.g. encryption) and PHY (e.g. encoding, modulation) parameters and triggers the PHY unit 102 to process them to generate selected PHY output data units for transmission. Because source and destination address have changed, the selected PHY output data units (i.e. the corresponding MSDU) are transmitted to the slave AP (the third communication device) and not to the intended STA (the second communication device).

In another embodiment for providing the one or more selected MAC output data units and the associated control information are provided to the slave AP using DS or wireline backhaul, as provided in step S106, the MAC unit 101 provides the MAP-MSDU to a higher layer (DS) together with destination address (DA), source address (SA), and length information. Consequently, DA is set to slave AP, and SA is set to master AP. It is the objective of the DS to convey this information (i.e. the selected MAC output data units and the control information) to the slave AP.

The master AP 100 may await an acknowledgement (ACK) (step S107) indicating successful reception of one or more MAP-MSDUs and may even retransmit MAP-MSDUs if needed.

Once the master AP conveyed all MAP-MSDUs to all slave APs needed for a JTX, possibly having received an acknowledgement, the master AP 100 may decide to initiate a JTX in step S108. The master AP 100 thus sends announcement information (an announcement frame) to all slave APs including at least the unique identifiers of the MAP-MSDUs that are going to be jointly transmitted in the following. Additionally, PHY layer configuration data may be added and spatial mapping matrices Q may be indicated (details will be explained below).

The master AP 100 then transmits in step S109 a PPDU with the PSDU(s) saved in step 102, either after a predefined time after the announcement information (frame) transmitted in step S107 has been transmitted or following a trigger transmitted by the master AP 100 to the slave APs. This is illustrated in FIG. 7 by the JTX trigger that may be provided by the control unit (e.g. the SME 103). It shall be noted that the announcement and the JTX may be transmitted separately or the information may be combined into a combined trigger.

It shall be noted that MSDUs may exist, which are to be transmitted by a master AP in a JTX and are not MAP eligible. These MSDUs may be stored in a memory at the master AP until the JTX starts. Conceptually, these can be stored either in the memory 105 or in memories, which are contained in the MAC unit 101 anyway, e.g. in a transmit queue.

Figure 9:
FIG. 9 shows a diagram illustrating a MAP-MSDU.

FIG. 9 shows a diagram illustrating a MAP-MSDU comprising a MAP header (MAP hdr) and a data portion comprising the MPDU or A-MPDU.

Figure 10:
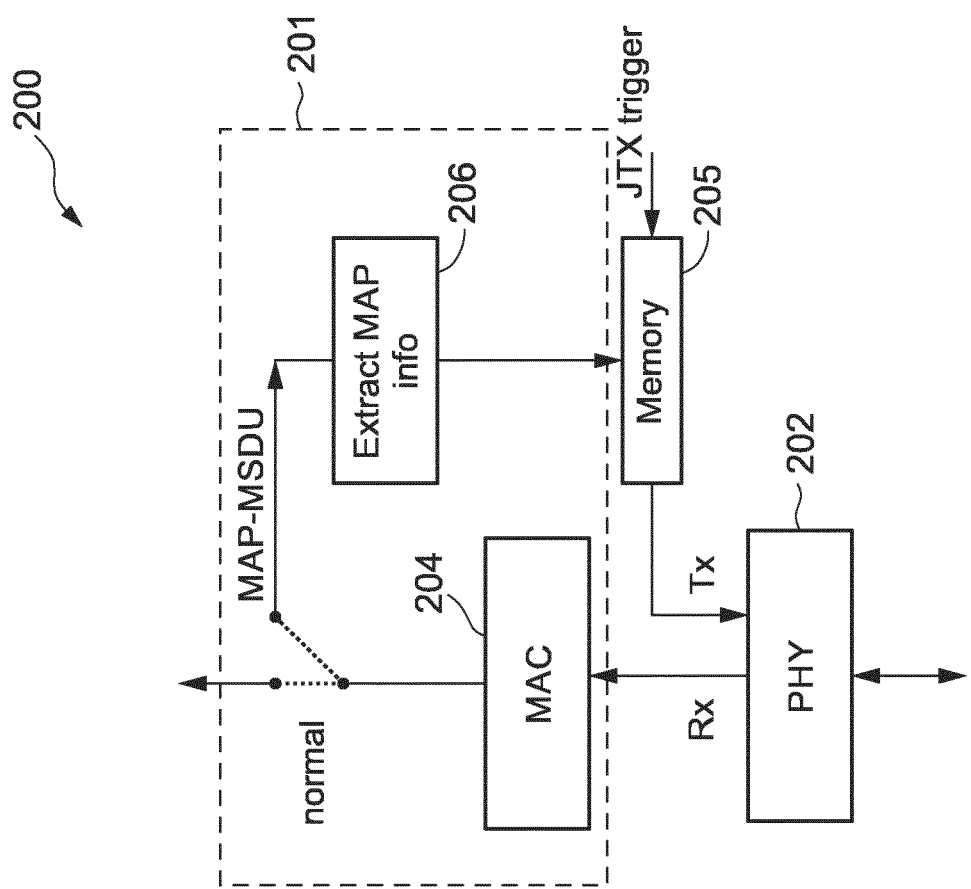
FIG. 10 shows a schematic diagram of a first embodiment of a third communication device to illustrate its operation as slave AP.
Figure 11:
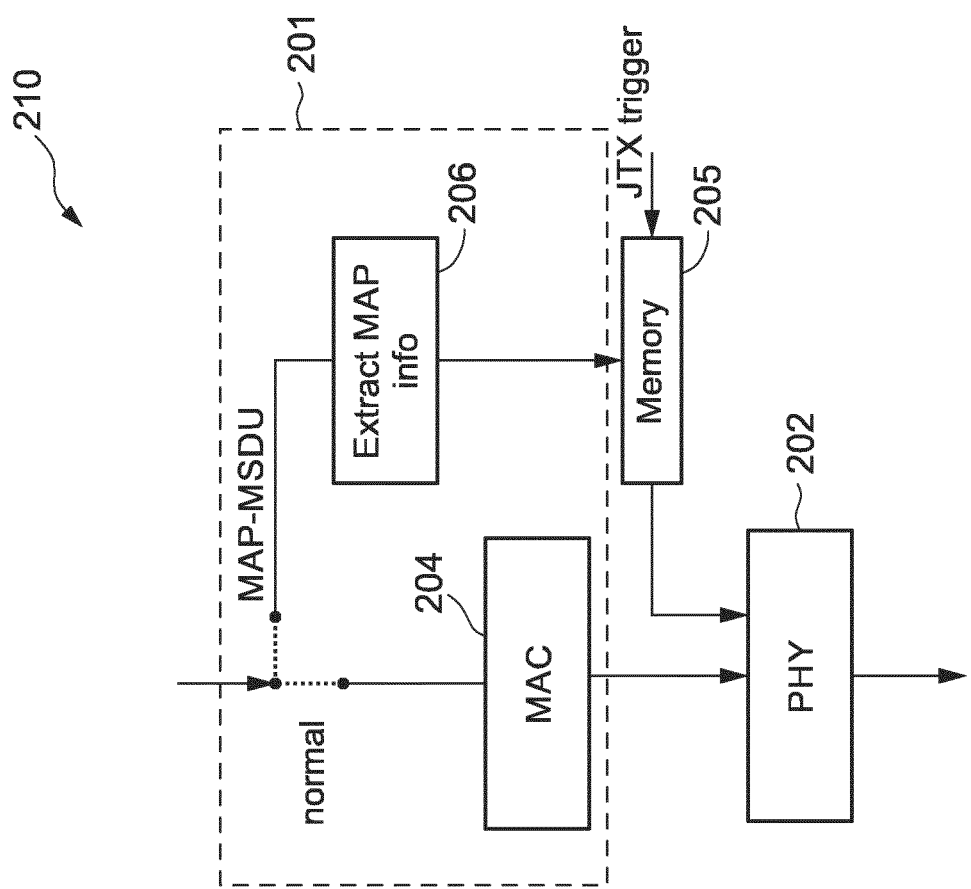
FIG. 11 shows a schematic diagram of a second embodiment of a third communication device to illustrate its operation as slave AP.
Figure 12:
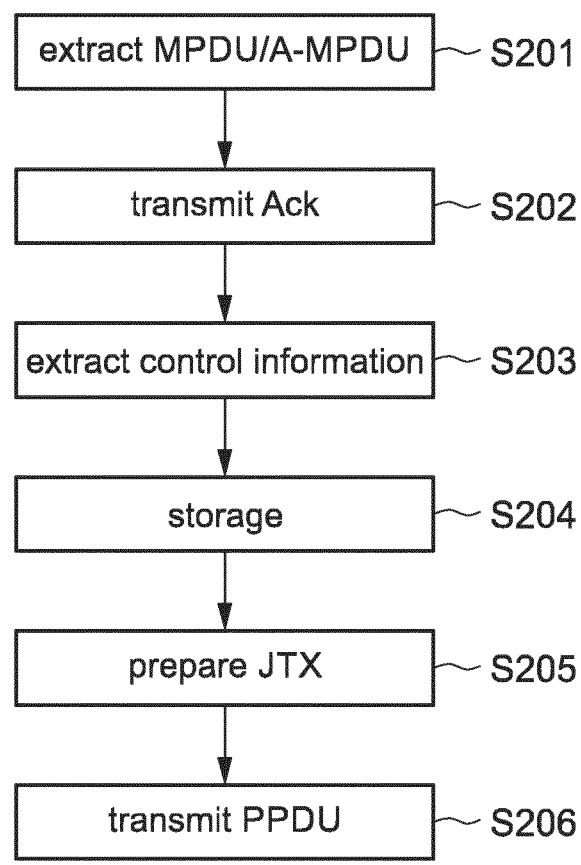
FIG. 12 shows a flowchart of the operation of the MAC unit of the slave AP.

FIGS. 10 and 11 show schematic diagrams of different embodiments of a third communication device 200 and 210 (each having a MAC unit 201 and a PHY unit 202) to illustrate its operation as slave AP according to the present disclosure in JTX. Once a slave AP receives a MAP-MSDU either via a received PPDU for wireless backhaul (FIG. 10) or via a higher layer interface for wireline backhaul (FIG. 11), it performs the following steps illustrated in the flowchart shown in FIG. 12.

Initially, one or more selected MAC output data units and the associated control information is obtained by the slave AP from the master AP. In particular, in a first step S201 the MAC unit 201 extracts the MPDU or A-MPDU and the identifier present in the MAP-MSDU (indicated by block 204). In case of wireless backhaul this may contain various steps: The PPDU holding the MAP-MSDU is demodulated, decoded, analyzed, defragmented and decrypted just as a regular PPDU is processed. In step S202 an acknowledgement may be transmitted according to the settings in the PPDU received.

The additional control information residing in the MAP-MSDU is extracted (indicated by block 206) in step S203 and the MPDU or A-MPDU together with the identifier are stored in a memory 205 in step S204. In step S203, the source address may be set to the master AP 100 and the destination address may be set to the station(s) that receives data in JTX.

Subsequently, the slave AP generates selected PHY output data units by performing PHY layer processing of the selected MAC output data units for transmission to the STA from the slave AP in coordination with the transmission of selected PHY output data units generated by the master AP from selected MAC output data units. In particular, once the slave AP 200/210 receives announcement information (frame), it configures its PHY unit 202 and spatial mapping matrix as indicated in the announcement and forwards the PSDU content, i.e. one or more MPDU or A-MPDU to the PHY unit 202 (step S205). The PHY unit 202 transmits a PPDU with the PSDUs either after a predefined time after the announcement information (frame) or after a trigger received from the master AP (step S206), which is illustrated by the JTX trigger triggering the memory 205 in FIGS. 10 and 11.

Figure 13:
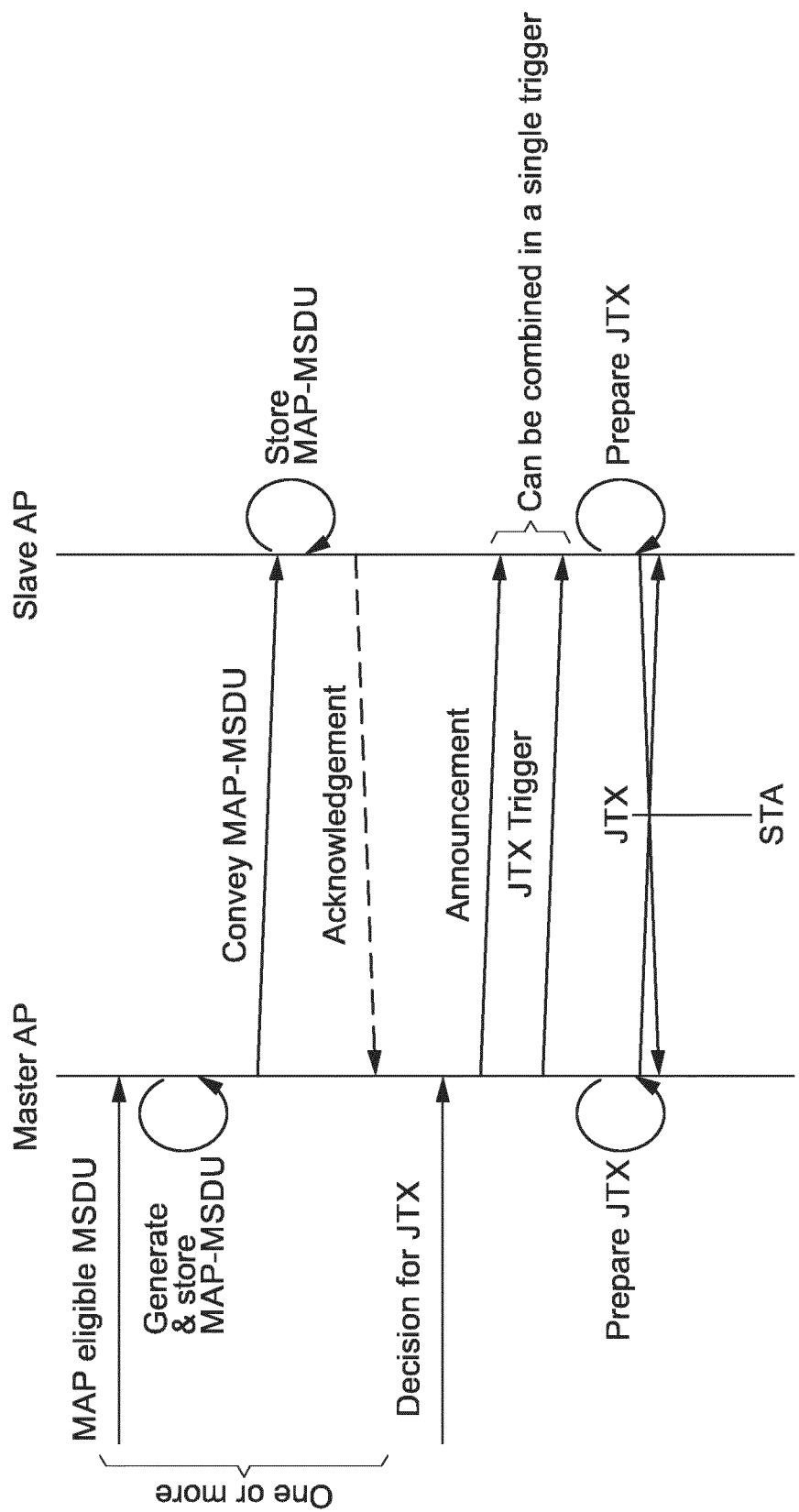
FIG. 13 shows a diagram illustrating the temporal operation of the master AP and the slave AP.

FIG. 13 shows a diagram illustrating the temporal operation of the master AP 200 and the slave AP 200/210 including dependencies between master AP and slave AP.

Figure 14:
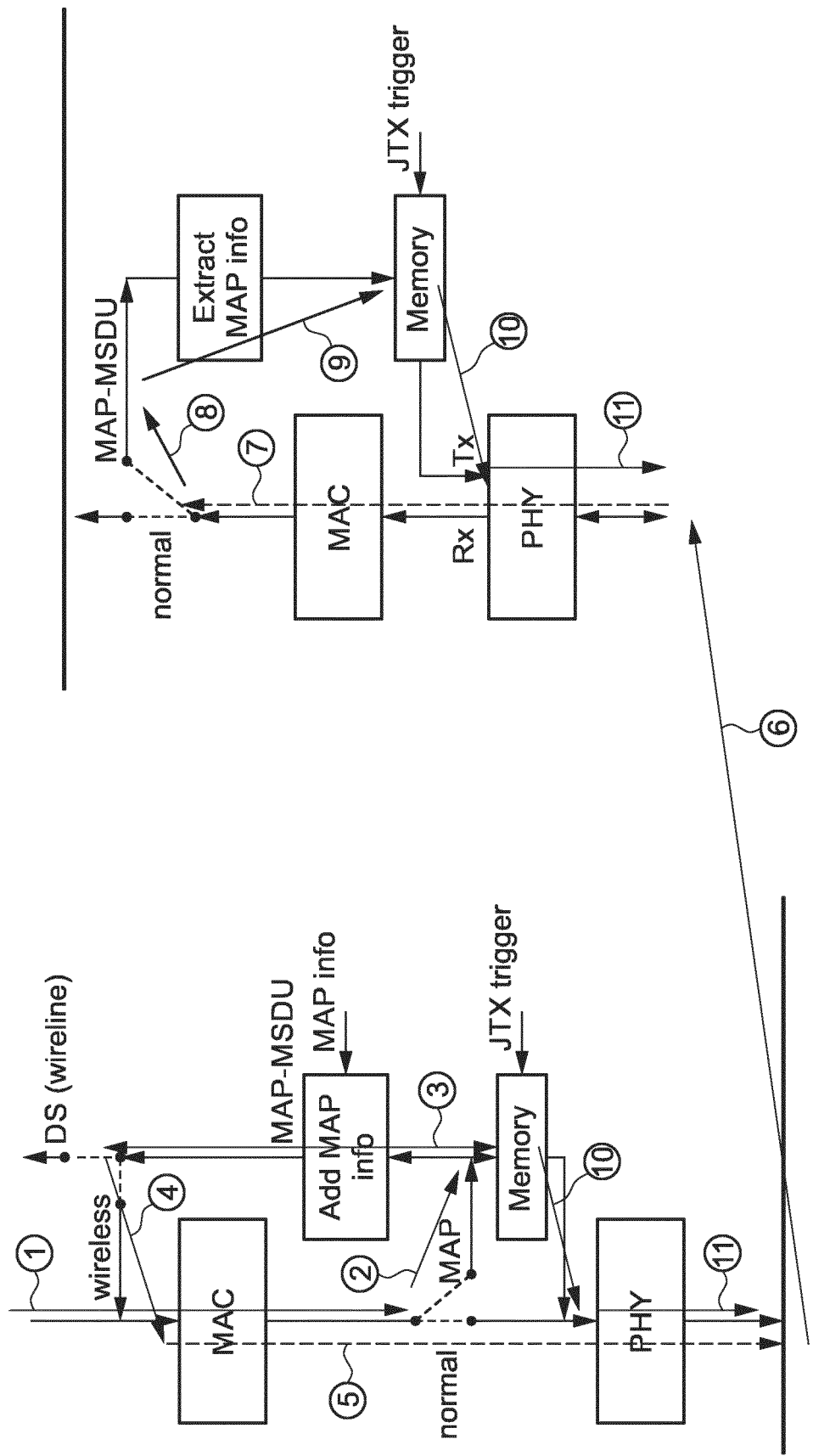
FIG. 14 shows a schematic diagram of the master AP and the slave AP illustrating—for the wireless backhaul case—the sequence of the steps of their operation and the flow of the information.

FIG. 14 shows a schematic diagram of the master AP 100 (as shown in FIG. 7) and the slave AP 200 (as shown in FIG. 10) illustrating—for the wireless backhaul case—the sequence of the steps of their operation and the flow of the information through the master AP 100 and the slave AP 200, indicated by encircled numbers from 1 to 11.

As shown in FIG. 14, after the backhaul operation, same MAC output data unit resides in memory at master and slave AP (assuming there are only MSDUs that are transmitted from both APs; otherwise, the memory content is a subset of each other). The dashed lines show the transmit and receive PHY MAC operation. Both cancel each other (If there is no transmission error; as this is a regular link, all features such as acknowledgement, retransmissions, etc. can be applied). This is a regular wireless link. The PHY configuration of this link is different to that in JTX. For JTX both APs send at the same time that MAC output data units by PHY layer processing as a PHY output data unit FIG. 15 shows a schematic diagram of the master AP 100 (as shown in FIG. 7) and the slave AP 210 (as shown in FIG. 11) illustrating—for the DS/wireline backhaul case—the sequence of the steps of their operation and the flow of the information through the master AP 100 and the slave AP 210, indicated by encircled numbers from 1 to 7.

Figure 15:
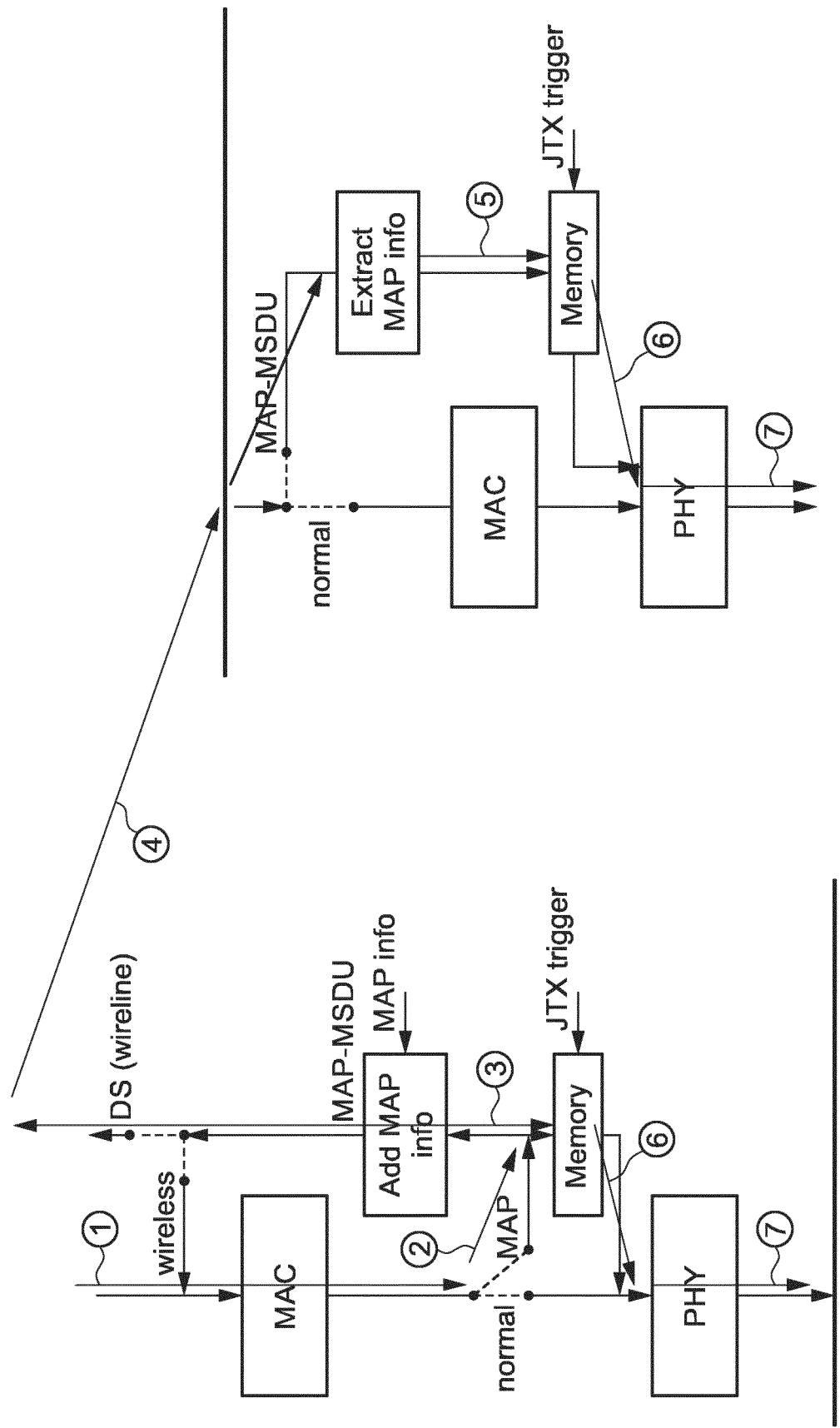
FIG. 15 shows a schematic diagram of the master AP and the slave AP illustrating—for the DS/wireline backhaul case—the sequence of the steps of their operation and the flow of the information.

As shown in FIG. 15, after the backhaul operation, the same MAC output data unit resides in memory at the master AP and the slave AP. For JTX both APs send at the same time these MAC output data units by PHY layer processing as a PHY output data unit.

In some embodiments, a slave AP may actually comprise an AP and a STA. The STA is collocated with the AP and both exchange data internally (e.g. via a station management entity, SME). This is to enable data exchange between AP and STA at all times, because AP to AP communication is not defined for WLAN devices. In this regard, the master AP sends wireless backhaul information to a STA, which is collocated with a slave AP. This STA is configuring the slave AP via internal data exchange as described above.

A MAP-MSDU contains the MPDU or A-MPDU to be transmitted by a slave AP during a JTX. Furthermore, it holds control information. The control information may reside in a frame that is aggregated to the MPDU or A-MPDU or that may be added in the form of a MAP header.

The control information may contain at least an identifier of the MAP-MSDU. This identifier is required for the master AP to indicate to the slave AP prior to JTX which MPDU or A-MPDU within a MAP-MSDU it is supposed to transmit. A slave AP may transmit multiple MPDU or A-MPDU of a MAP-MSDUs in a JTX. Thus, the set of identifiers may arrange the order of MPDU or A-MPDU of MAP-MSDUs to be sent.

In order for a JTX to be successful, more control information may be provided to the slave AP by the master AP. This information may either reside in control information described above or in the announcement frame or in the trigger, which precedes a JTX. The information may include one or more of
 the configuration of the PHY layer of the slave AP;
 (optional) spatial mapping matrix relevant for the slave AP (i.e. at least $Q_2$ in the example above);
 spatial stream index or indices that the slave AP is going to serve.

The announcement or trigger frame may include one or more identifiers of the MPDU or A-MPDU within a MAP-MSDUs to be transmitted by the slave APs in the upcoming JTX.

There are various options for the PHY operation. They are different in the tasks each AP needs to perform in JTX. The assumption is that each AP has two transmit antennas and that four transmit antennas are used in joint transmission of two APs.

Figure 16:
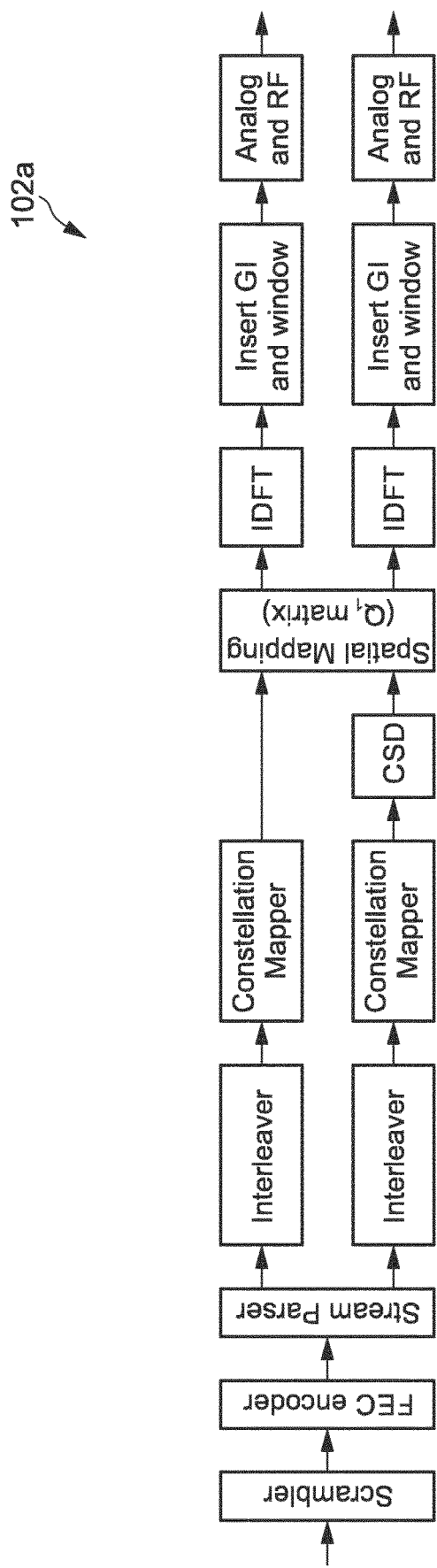
FIG. 16 shows a schematic diagram of an embodiment of a PHY unit of the (master or slave) AP in non-MAP mode.

First, in FIG. 16, a schematic diagram of an embodiment of a PHY unit 102 (indicated here as 102a) of the AP 100 is illustrated in non-MAP mode, i.e. regular mode in which there is no JTX, but all MSDUs are transmitted to the STA from the master AP only. It shall be noted that the PHY unit of slave APs 200 and 210 is configured accordingly in the non-MAP mode.

Figure 17:
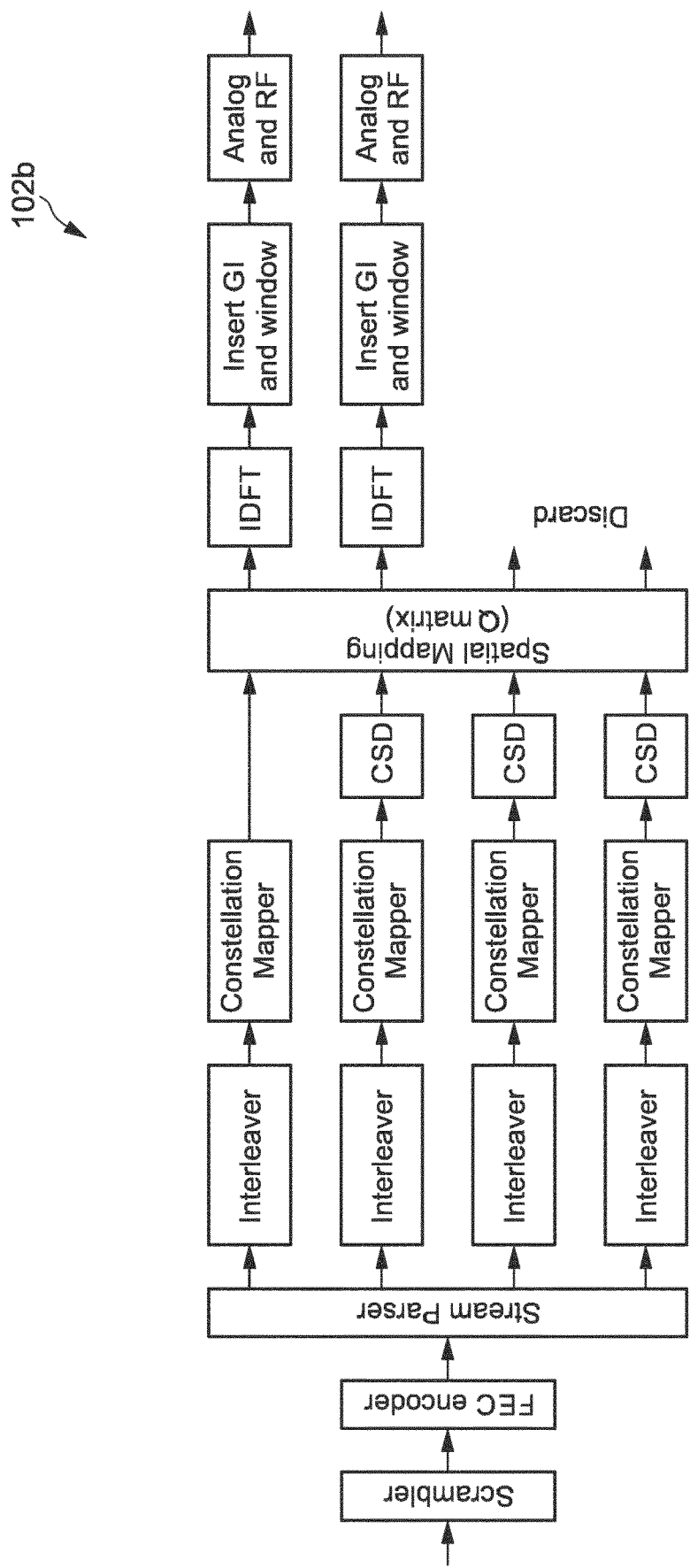
FIG. 17 shows a schematic diagram of a first embodiment of the PHY unit of the master AP 100 in MAP mode.
Figure 18:
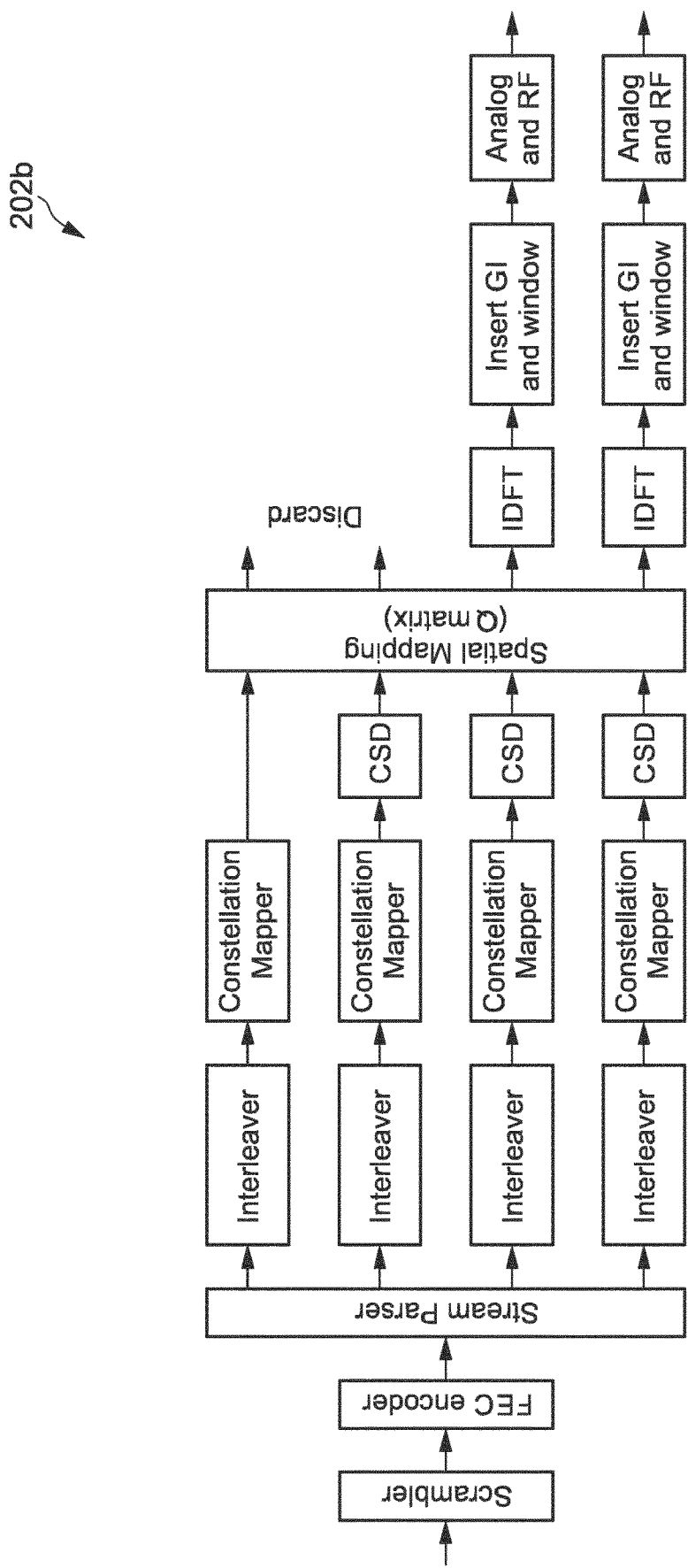
FIG. 18 shows a schematic diagram of a first embodiment of the PHY unit of the slave AP in MAP mode.

FIG. 17 shows a schematic diagram of a first embodiment of the PHY unit 102 (indicated here as 102b) of the AP 100 in MAP mode. FIG. 18 shows a schematic diagram of a first embodiment of the PHY unit 202 (indicated here as 202b) of the AP 200 in MAP mode. In an alternative embodiment the embodiment shown in FIG. 17 may be used in the slave AP 200 and the embodiment shown in FIG. 18 may be used in the master AP 100.

Figure 19:
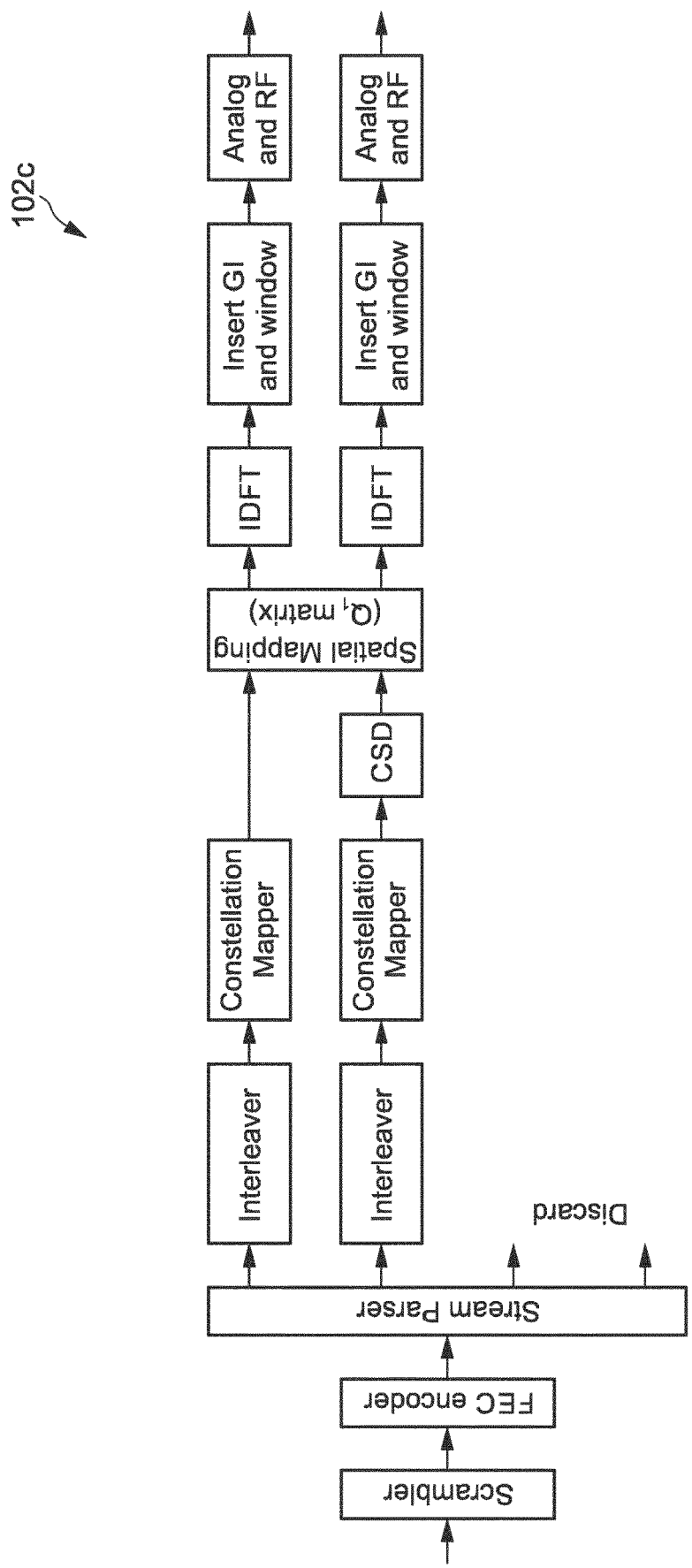
FIG. 19 shows a schematic diagram of a second embodiment of the PHY unit of the master AP 100 in MAP mode.
Figure 20:
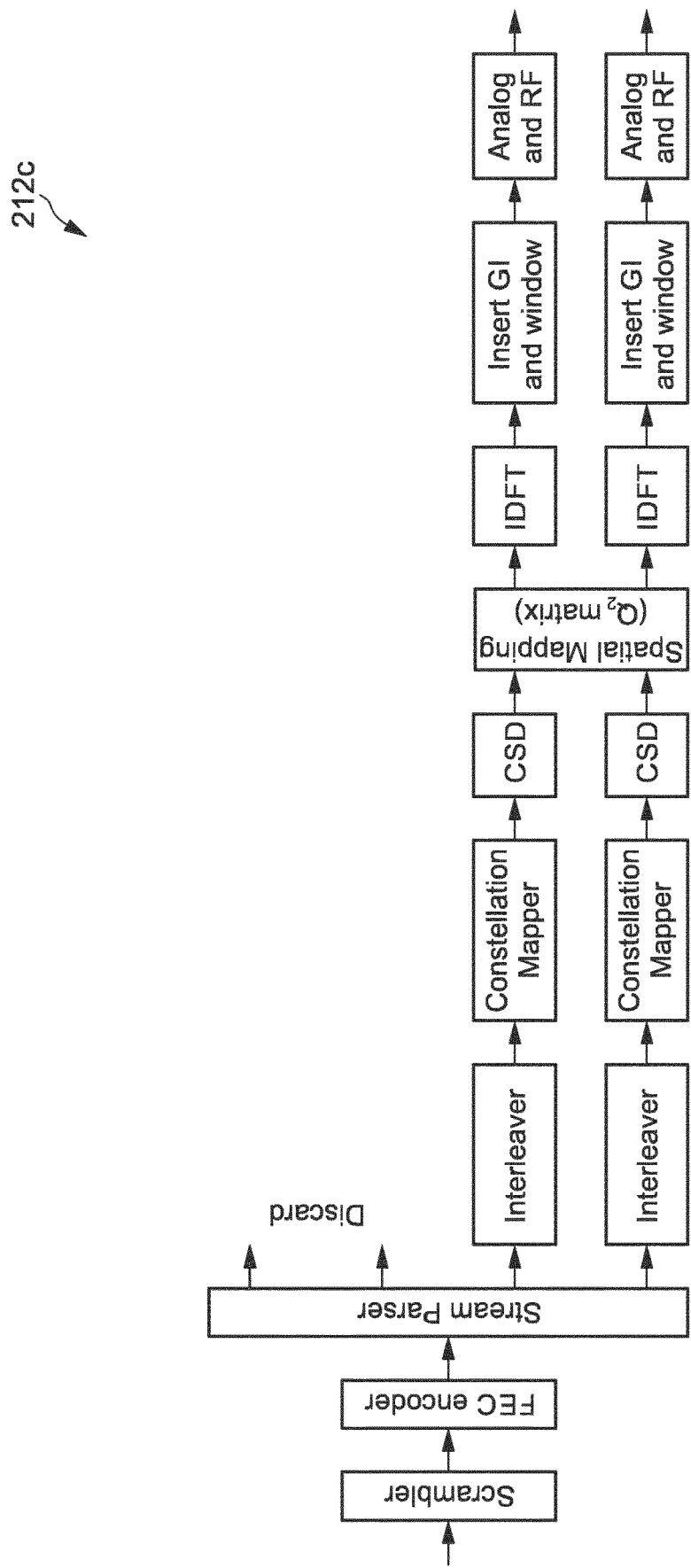
FIG. 20 shows a schematic diagram of a second embodiment of the PHY unit of the slave AP in MAP mode.

The first embodiment shown in FIGS. 17 and 18 uses the most general approach. It is more complex, but provides most MAP gain. Each PHY unit 102b, 202b performs scrambling, FEC encoding, stream parsing, interleaving (optional), constellation mapping and CSD for all $N_{SS}$ spatial streams in MAP. These operations are performed in each AP at same time. Following the CSD operation, each PHY unit 102b, 202b *multiplies with its $Q_i$ matrix*, which maps $N_{SS}$ spatial streams to $N_{TX,i}$ transmit streams. $N_{TX,i}$ corresponds to the number of active transmit chains or transmit antennas used. After that, each PHY unit 102b, 202b performs IDFT operation, insertion of GI, windowing, and analog & RF processing for its own $N_{TX,i}$ active transmit chains. If $N_{SS}>N_{TX,i}$, the processing capabilities of the PHY unit needed before the spatial mapping are greater than after the spatial mapping. FIG. 19 shows a schematic diagram of a second embodiment of the PHY unit 102 (indicated here as 102c) of the AP 100 in MAP mode. FIG. 20 shows a schematic diagram of a second embodiment of the PHY unit 212 (indicated here as 212c) of the AP 210 in MAP mode. In an alternative embodiment the embodiment shown in FIG. 19 may be used in the slave AP 210 and the embodiment shown in FIG. 20 may be used in the master AP 100.

The second embodiment shown in FIGS. 19 and 20 uses a less general approach. It is less complex, but provides a less positive MAP gain. Each PHY unit 102c, 212c performs scrambling, FEC encoding, and stream parsing. These operations are performed in each AP at same time. Following the stream parser operation, each PHY unit 102c, 212c performs interleaving (optional), constellation mapping, CSD (optional), spatial mapping with its $Q_i$ matrix, IDFT operation, insertion of GI, windowing, and analog & RF processing for its own $N_{TX,i}$ active transmit chains. If $N_{SS} > N_{TX,i}$, the required processing capabilities of the PHY unit are significantly lower compared to the first embodiment.

The $Q_i$ matrix has a different size compared to the first embodiment. In the first embodiment $Q_i$ is of size $N_{TX,i} \times N_{SS}$, whereas in the second embodiment the size is $N_{TX,i} \times N_{TX,i}$. The overall Q is $$Q = \begin{bmatrix} Q_1 \\ Q_2 \end{bmatrix}$$

for the first embodiment, whereas Q is $$Q = \begin{bmatrix} Q_1 & 0 \\ 0 & Q_2 \end{bmatrix}$$

for the second embodiment when $N_{SS} > N_{TX,i}$. Thus, the second embodiment assumes zero entries on the anti-diagonal to be present in overall Q matrix.

For the first embodiment, the stream parser operates conventionally. It assigns in a round robin fashion consecutive bits to a first spatial stream. Following that, it further assigns following consecutive bits to second spatial stream and so on. When bits to the last spatial stream have been assigned, it continues with the first spatial stream. However, for the second embodiment, only the relevant output of the stream parser is processed further and non-relevant spatial streams for a particular AP are not further considered. This means that an AP discards some outputs of the stream parser.

In principle, the first and second embodiments may be combined in the sense that the master AP operates according to the first embodiment whereas a slave AP operates according to the second embodiment, for example.

All PHY components in all APs preferably use the same settings. These settings may be shared by the master AP with the slave APs and include all or a subset of the TXVECTOR parameters. The TXVECTOR parameters are configuring the PHY for a transmission. Compression schemes for the TXVECTOR may be applicable. One method comprises in transmitting the PHY headers for the JTX as they contain all relevant TXVECTOR information for the receiver to process the incoming PPDU.

For preambles as well as for the second embodiment, an AP should know what the spatial streams are that it is supposed to serve in JTX. This is indicated by a spatial stream index number. For the example in FIGS. 19 and 20 the master AP transmits spatial streams 1 and 2, whereas a slave AP serves spatial streams 3 and 4.

Either the master AP may compute the overall spatial mapping matrix Q or each AP may compute its own spatial mapping matrix. In the first case, at least that part of the Q matrix, which is relevant to a slave AP, is signaled, whereas in the second case, Q matrix signaling is not needed.

Embodiments of the present disclosure have been explained in detail. In the following a short summary of essential aspects of the present disclosure shall be provided.

The present disclosure seeks to provide an enhancement of reliability, latency, and throughput of wireless communication, which are recently required for applications such as UHD video transfer including AR/VR. It is assumed that Multiple APs (multi-AP) transmit jointly to one or more STAs at same time (also known as network MIMO). Each AP's transmit signal in joint transmission originates from (at least partly) the same data. Multiple APs are categorized in one master AP and one or more slave APs. STAs are (at least) logically associated to the master AP.

The backhaul transmission of the PHY waveform is very inefficient because the PHY waveform is an analog signal and it holds PHY redundancy. The required backhaul bit rate demand is thus very high, which is undesired because it limits the throughput and applicability of multi-AP. It is an object to minimize the rate requirements for the backhaul. The presented solution can thus be seen as a backhaul compression. Further, a very simple compression and decompression of the backhaul data by master and slave AP, respectively, shall be enabled.

Figure 21:
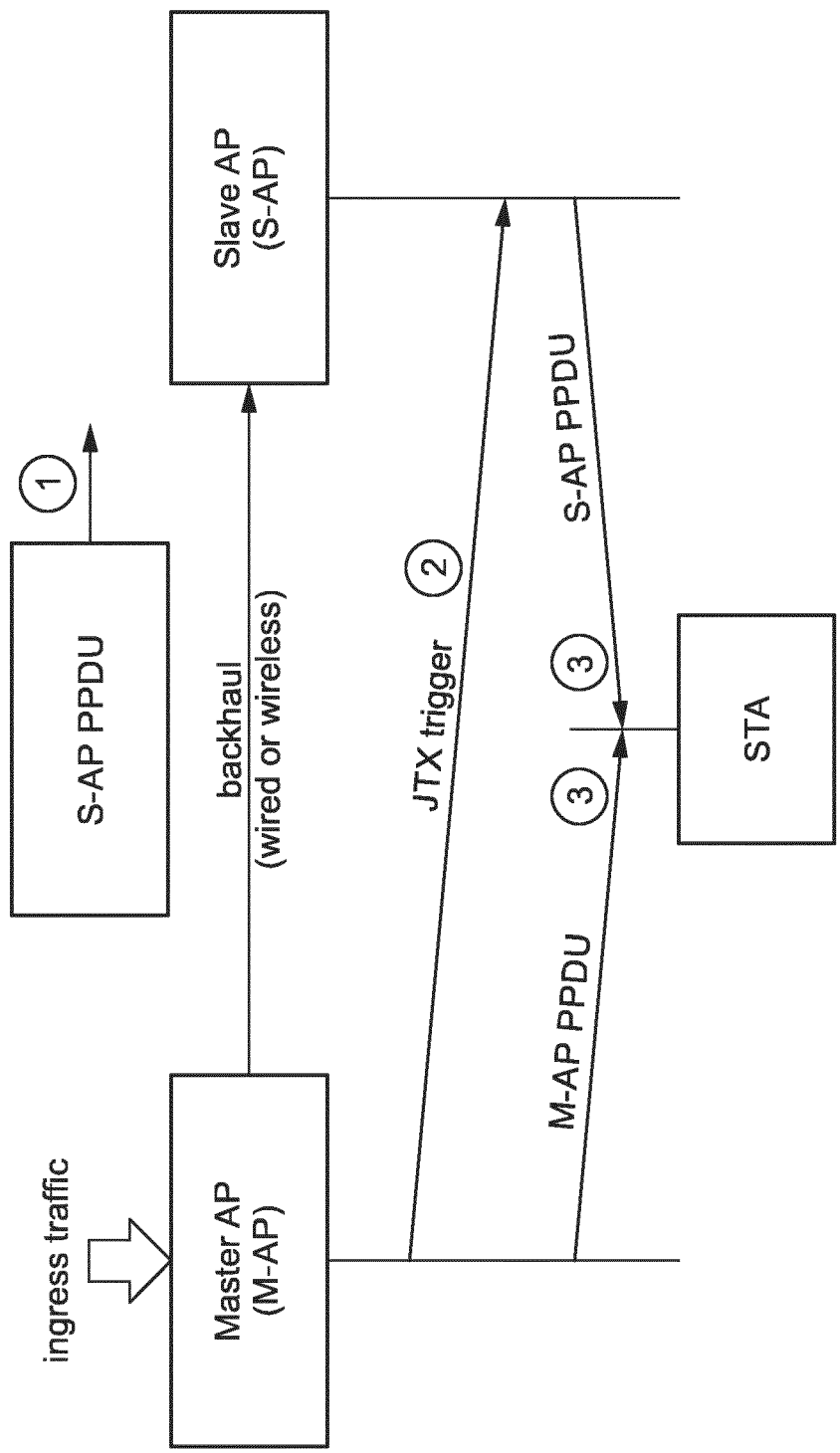
FIG. 21 shows a diagram illustrating the main concept of a known communication scheme.

The main concept of a known communication scheme is illustrated in FIG. 21. The master AP generates the PPDU (waveform) for the slave AP and transmits the digitized PPDU waveform to the slave AP via the backhaul (step 1). The slave AP transmits the received waveform once it receives a trigger (step 2) for joint transmission (step 3). Thus, the backhaul conveys the PPDU waveform.

Figure 22:
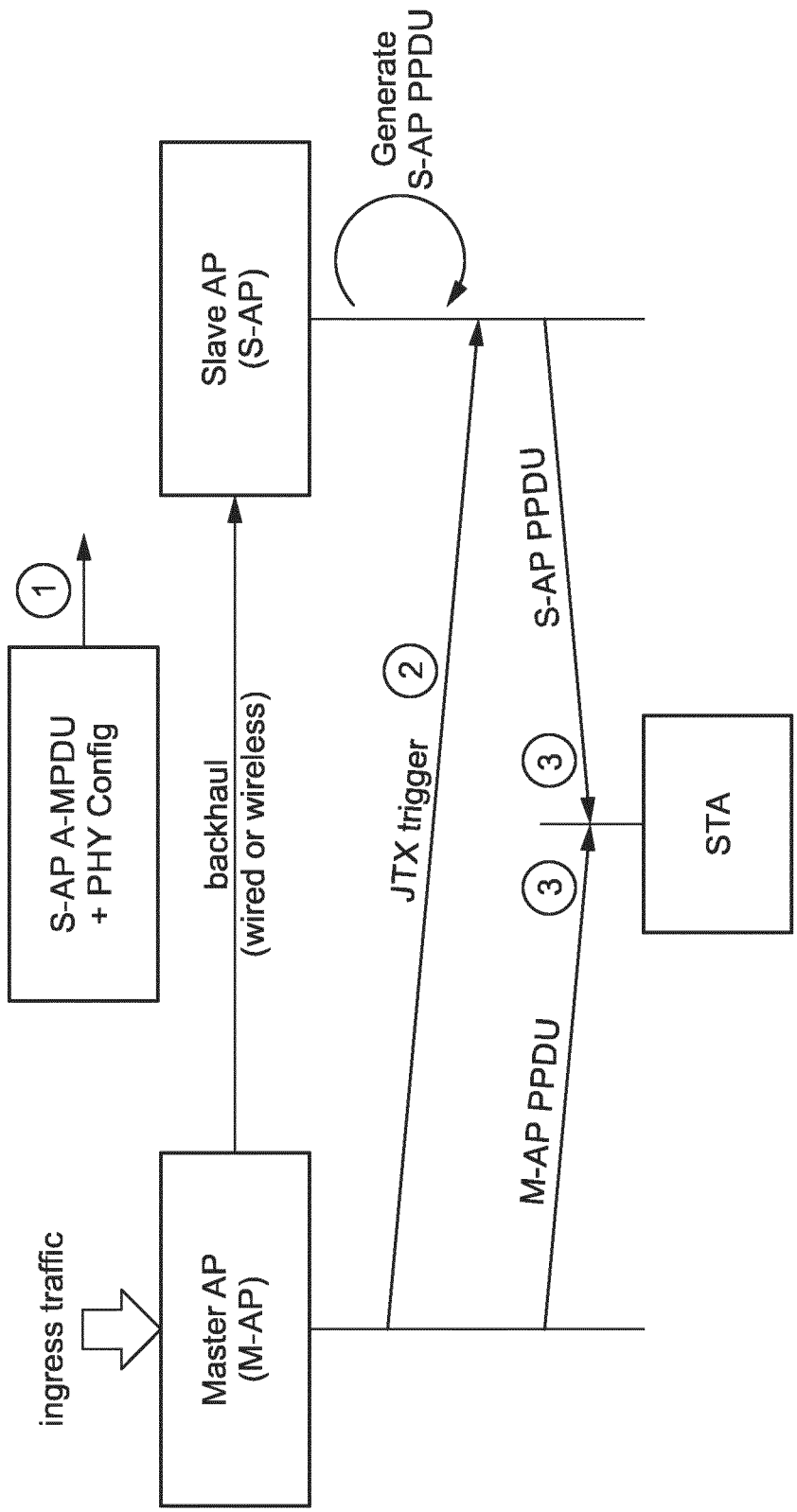
FIG. 22 shows a diagram illustrating the main concept of the communication scheme according to the present disclosure.

The main concept of communication scheme according to the present disclosure is illustrated in FIG. 22. The master AP transmits (step 1) MDPU or A-MPDU in conjunction with PHY configuration that shall be applied for JTX. The slave AP processes the received MPDU or A-MPDU in its PHY layer according to the PHY configuration received and generates the PPDU waveform which it is transmuted once it receives (step 2) a trigger for JTX (step 3).

In more detail, and as illustrated in FIGS. 7 to 12, according to the present disclosure the master AP generates an A-MPDU that is stored in memory for later joint transmission and M-AP info (e.g. PHY config, identifier) is added. The A-MPDU and M-AP info forms a MAP-MSDU that can either go to the DS or be interpreted as a regular MSDU for wireless transmission. After the JTX trigger, the A-MPDU in memory is processed by the master AP PHY and the PPDU is transmitted. In one embodiment the slave AP (DS) receives a MAP-MSDU from DS and extracts M-AP info. The A-MPDU is then stored in memory for later joint transmission. When JTX trigger is received the slave AP PHY processes the A-MPDU according to the PHY config in M-AP info and the PPDU is transmitted. In another embodiment the slave AP (wireless) receives a PPDU from master AP that contains the MAP-MSDU. The MAP-MSDU is extracted from the backhaul PPDU. The following processing is as in the first embodiment. It shall be noted that the PHY configuration is different for backhaul and JTX PPDU.

Thus, to summarize this disclosure, the backhaul consist of data units (MPDU/A-MPDU or PSDU) to be transmitted by the slave AP plus configuration data. In known systems, the master AP generates the transmit signal for the slave AP and the backhaul conveys the PPDU of a slave AP. According to the present disclosure, the backhaul consist of data units (MPDU/A-MPDU or PSDU) to be transmitted by the slave AP plus configuration data.

Implementing the backhaul on MPDU/A-MPDU level is much more efficient than doing on PPDU level, which would need quantization of I and Q components for each sample and redundancy due to channel coding. Assuming 8 bit quantization for each I and Q component and channel code rate of ½, the overhead in terms of backhaul bitrate requirement is reduced by factor of (8*2*2=32).

The presented backhaul proposal may further seamlessly integrated into a regular 802.11 link, thus all MAC features such as BAck or Ack can be used.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors, which are programmed or configured according to software code. A circuit does not include pure software, although a circuit includes the above-described hardware executing software.

It follows a list of further embodiments of the disclosed subject matter:

1. First communication device comprising:
    MAC layer circuitry configured to
        generate MAC output data units by performing media access control (MAC) layer processing of MAC input data units to be transmitted to a second communication device, and
        generate control information for one or more selected MAC output data units, the control information indicating that the one or more selected MAC output data units are to be physical (PHY) layer processed by the third communication device and to be transmitted to the second communication device from the third communication device and from the first communication device; and
    PHY layer circuitry configured to generate PHY output data units by performing PHY layer processing of the MAC output data units, wherein selected PHY output data units are generated from the selected MAC output data units for transmission to the second communication device from the first communication device in coordination with the transmission of selected PHY output data units generated by the third communication device from the selected MAC output data units,
    wherein the first communication device is configured to provide the one or more selected MAC output data units and the associated control information to the third communication device.

2. First communication device as defined in any preceding embodiment, wherein the MAC layer circuitry is configured to select, for generating the selected MAC output data units, one or more MAC input data units based on one or more of a destination address of a MAC input data unit, the location of the second communication unit, channel state information between the first and second communication devices, channel state information between the third and second communication devices, and a priority of a MAC input data unit.

3. First communication device as defined in any preceding embodiment, wherein the control information comprises source address information indicating the first communication device as a source of a selected MAC output data unit and destination address information indicating the third communication device as a destination of a selected MAC output data unit.

4. First communication device as defined in any preceding embodiment, wherein the control information comprises an identifier that identifies a selected MAC output data unit.

5. First communication device as defined in any preceding embodiment, wherein the first communication device is configured to notify the third communication device of the coordinated transmission of selected PHY output data units by the first communication device and the third communication device.

6. First communication device as defined in embodiment 5, wherein the first communication device is configured to notify the third communication device by transmitting a trigger and/or announcement comprising one or more of
    an identifier of one or more selected MAC output data units to be used for generating the selected PHY output data units for transmission to the second communication device by the third communication device in the coordinated transmission,
    PHY layer configuration information indicating the configuration of PHY layer circuitry of the third communication device used for generating the selected PHY output data units,
    spatial mapping information indicating spatial mapping performed by the third communication device used in the coordinated transmission, and
    stream index information indicating one or more streams served by the third communication device used in the coordinated transmission.

7. First communication device as defined in any preceding embodiment, wherein the control information is included in or associated with the respective selected MAC output data unit.

8. First communication device as defined in embodiment 7, wherein the control information is included in a prepended header of the respective selected MAC output data unit or in a control frame.

9. First communication device as defined in any preceding embodiment,
wherein the MAC layer circuitry is configured to perform, after generating the control information, MAC layer processing of the one or more selected MAC output data units as selected MAC input data units to generate one or more selected new MAC output data units, and
wherein the PHY layer circuitry is configured to perform PHY layer processing of the one or more selected new MAC output data units to generate one or more selected new PHY output data units for transmission to the third communication device according to address information included in the control information.

10. First communication device as defined in any preceding embodiment,
wherein the first communication device is configured to provide the one or more selected MAC output data units along with the control information to an external entity different from the third communication device to enable the external entity to provide the one or more selected MAC output data units to the third communication device according to the control information.

11. First communication device as defined in any preceding embodiment,
wherein the first communication device and the third communication device are configured to operate as access point and the second communication device is configured to operate as station.

12. First communication device as defined in any preceding embodiment,
wherein the MAC input data unit is a MAC service data unit (MSDU) or aggregated MSDU (A-MSDU), the MAC output data unit is a MAC protocol data unit (MPDU) or aggregated MPDU (A-MPDU) and the PHY output data unit is a physical protocol data unit (PPDU).

13. First communication device as defined in any preceding embodiment,
wherein the PHY layer circuitry is configured to
divide the MAC output data units into N spatial streams (N corresponding to the number of spatial streams in coordinated transmission),
perform, per spatial stream and in parallel, interleaving and/or constellation mapping processing,
perform spatial stream mapping to map the processed N spatial streams onto M transmit streams, and
perform inverse Fourier transforming and analog and RF processing of M transmit streams to generate M transmit signals, M corresponding to the number of active transmit chains of the first communication device.

14. First communication device as defined in any preceding embodiment,
wherein the PHY layer circuitry is configured to
divide the MAC output data units into N spatial streams, and
perform, for M of the N spatial streams, per spatial stream and in parallel, interleaving and/or constellation mapping, spatial stream mapping, inverse Fourier transforming, and analog and RF processing to generate M transmit signals, M corresponding to the number of active transmit chains of the first communication device.

15. Third communication device comprising:
MAC layer circuitry configured to obtain one or more selected media access control (MAC) output data units and associated control information from a first communication device, the control information indicating that the one or more MAC selected output data units are to be physical (PHY) layer processed by the third communication device and to be transmitted to the second communication device from the third communication device and from the first communication device; and
PHY layer circuitry configured to generate selected PHY output data units by performing PHY layer processing of the selected MAC output data units for transmission to the second communication device from the third communication device in coordination with the transmission of selected PHY output data units generated by the first communication device from selected MAC output data units.

16. Third communication device as defined in embodiment 15,
wherein the PHY layer circuitry is configured to receive one or more selected MAC output data units from the first communication device and to perform inverse PHY layer processing of the one or more selected MAC output data units to generate inverse PHY layer output data units,
wherein the MAC layer circuitry is configured to perform inverse MAC layer processing of the inverse PHY layer output data units to obtain the associated control information and the selected MAC output data units, and
wherein the PHY layer circuitry is configured to generate the selected PHY output data units from the selected MAC output data units.

17. Third communication device as defined in any one of embodiments 15 to 16, wherein the MAC layer circuitry is configured to receive one or more selected MAC output data units and the associated control information from an external entity different from the first communication device.

18. Third communication device as defined in any one of embodiments 15 to 17, wherein the MAC layer circuitry is configured to process the control information, the control information comprising an identifier that identifies a selected MAC output data unit.

19. Third communication device as defined in any one of embodiments 15 to 18, wherein the third communication device is configured to receive a notification from the first communication device notifying the third communication device of the coordinated transmission of PHY output data units by the first communication device and the third communication device.

20. Third communication device as defined in any one of embodiments 15 to 19, wherein the third communication device is configured
to receive a trigger and/or announcement comprising one or more of
an identifier of one or more selected MAC output data units to be used for generating the selected PHY output data units for transmission to the second communication device by the third communication device in the coordinated transmission,
PHY layer configuration information indicating the configuration of PHY layer circuitry of the third communication device used for generating the selected PHY output data units,
spatial mapping information indicating spatial mapping performed by the third communication device used in the coordinated transmission, and stream index information indicating one or more streams served by the third communication device used in the coordinated transmission, and to use the information comprised in the trigger and/or announcement for determining the selected MAC output data units and/or for setting the PHY layer configuration, the spatial mapping and/or the streaming of one or more streams.

21. Communication method of a first communication device, the first communication method comprising:

generating MAC output data units by performing media access control (MAC) layer processing of MAC input data units to be transmitted to a second communication device, generating control information for one or more selected MAC output data units, the control information indicating that the one or more selected MAC output data units are to be physical (PHY) layer processed by the third communication device and to be transmitted to the second communication device from the third communication device and from the first communication device, providing the one or more selected MAC output data units and the associated control information to the third communication device, and generating PHY output data units by performing PHY layer processing of the MAC output data units, wherein selected PHY output data units are generated from the selected MAC output data units for transmission to the second communication device from the first communication device in coordination with the transmission of selected PHY output data units generated by the third communication device from the selected MAC output data units.

22. Communication method of a third communication device, the third communication method comprising:

obtaining one or more selected media access control (MAC) output data units and associated control information from a first communication device, the control information indicating that the one or more MAC selected output data units are to be physical (PHY) layer processed by the third communication device and to be transmitted to the second communication device from the third communication device and from the first communication device, and generating selected PHY output data units by performing PHY layer processing of the selected MAC output data units for transmission to the second communication device from the third communication device in coordination with the transmission of selected PHY output data units generated by the first communication device from selected MAC output data units.

23. A non-transitory computer-readable recording medium that stores therein a computer program product, which, when executed by a processor, causes the method according to 21 or 22 to be performed.

24. A computer program comprising program code means for causing a computer to perform the steps of said method according to embodiment 21 or 22 when said computer program is carried out on a computer.

The invention claimed is:

1. First communication device comprising:
MAC layer circuitry configured to
generate MAC output data units by performing media access control (MAC) layer processing of MAC input data units to be transmitted to a second communication device, and generate control information for one or more selected MAC output data units, the control information indicating that the one or more selected MAC output data units are to be processed by a physical (PHY) layer of a third communication device and to be transmitted to the second communication device from the third communication device and from the first communication device, wherein the first communication device operates as a master access point (AP) and the third communication device operates as a slave AP; and PHY layer circuitry configured to generate PHY output data units by performing PHY layer processing of the MAC output data units, wherein selected PHY output data units are generated from the selected MAC output data units for transmission to the second communication device from the first communication device in coordination with the transmission of selected PHY output data units generated by the third communication device from the selected MAC output data units, wherein the coordination comprises a joint transmission of the selected PHY output data units at the same time from both the first communication device and the third communication device, wherein the first communication device is configured to provide the one or more selected MAC output data units and the associated control information to the third communication device, and wherein the MAC layer circuitry is further configured to combine the selected MAC output data units and the control information to form a multi-access point MAC service data unit (MAP-MSDU), wherein the control information includes at least PHY configuration information and an identifier, and provide the MAP-MSDU to the third communication device at a MAC protocol data unit (MPDU) or aggregated MPDU (A-MPDU) level rather than at a physical protocol data unit (PPDU) level;

wherein the first communication device is configured to provide the one or more selected MAC output data units along with the control information to an external entity different from the third communication device to enable the external entity to provide the one or more selected MAC output data units to the third communication device according to the control information.

2. First communication device as claimed in claim 1, wherein the MAC layer circuitry is configured to select, for generating the selected MAC output data units, one or more MAC input data units based on one or more of a destination address of a MAC input data unit, the location of the second communication unit, channel state information between the first and second communication devices, channel state information between the third and second communication devices, and a priority of a MAC input data unit.

3. First communication device as claimed in claim 1, wherein the control information comprises source address information indicating the first communication device as a source of a selected MAC output data unit and destination address information indicating the third communication device as a destination of a selected MAC output data unit.

4. First communication device as claimed in claim 1, wherein the control information comprises an identifier that identifies a selected MAC output data unit.

5. First communication device as claimed in claim 1, wherein the first communication device is configured to notify the third communication device of the coordinated transmission of selected PHY output data units by the first communication device and the third communication device.

6. First communication device as claimed in claim 5, wherein the first communication device is configured to notify the third communication device by transmitting a trigger and/or announcement comprising one or more of an identifier of one or more selected MAC output data units to be used for generating the selected PHY output data units for transmission to the second communication device by the third communication device in the coordinated transmission, PHY layer configuration information indicating the configuration of PHY layer circuitry of the third communication device used for generating the selected PHY output data units, spatial mapping information indicating spatial mapping performed by the third communication device used in the coordinated transmission, and stream index information indicating one or more streams served by the third communication device used in the coordinated transmission.

7. First communication device as claimed in claim 1, wherein the control information is included in or associated with the respective selected MAC output data unit.

8. First communication device as claimed in claim 7, wherein the control information is included in a prepended header of the respective selected MAC output data unit or in a control frame.

9. First communication device as claimed in claim 1, wherein the MAC layer circuitry is configured to perform, after generating the control information, MAC layer processing of the one or more selected MAC output data units as selected MAC input data units to generate one or more selected new MAC output data units, and wherein the PHY layer circuitry is configured to perform PHY layer processing of the one or more selected new MAC output data units to generate one or more selected new PHY output data units for transmission to the third communication device according to address information included in the control information.

10. First communication device as claimed in claim 1, wherein the first communication device and the third communication device are configured to operate as access point and the second communication device is configured to operate as station.

11. First communication device as claimed in claim 1, wherein the MAC input data unit is a MAC service data unit (MSDU) or aggregated MSDU (A-MSDU), the MAC output data unit is a MAC protocol data unit (MPDU) or aggregated MPDU (A-MPDU) and the PHY output data unit is a physical protocol data unit (PPDU).

12. First communication device as claimed in claim 1, wherein the PHY layer circuitry is configured to divide the MAC output data units into N spatial streams, perform, per spatial stream and in parallel, interleaving and/or constellation mapping processing, perform spatial stream mapping to map the processed N spatial streams onto M transmit streams, and perform inverse Fourier transforming and analog and RF processing of M transmit streams to generate M transmit signals, M corresponding to the number of active transmit chains of the first communication device.

13. First communication device as claimed in claim 1, wherein the PHY layer circuitry is configured to divide the MAC output data units into N spatial streams, and perform, for M of the N spatial streams, per spatial stream and in parallel, interleaving and/or constellation mapping, spatial stream mapping, inverse Fourier transforming, and analog and RF processing to generate M transmit signals, M corresponding to the number of active transmit chains of the first communication device.

14. Communication method of a first communication device, the first communication method comprising:

generating MAC output data units by performing media access control (MAC) layer processing of MAC input data units to be transmitted to a second communication device, generating control information for one or more selected MAC output data units, the control information indicating that the one or more selected MAC output data units are to be processed by a physical (PHY) layer of a third communication device and to be transmitted to the second communication device from the third communication device and from the first communication device, wherein the first communication device operates as a master access point (AP) and the third communication device operates as a slave AP;

providing the one or more selected MAC output data units and the associated control information to the third communication device;

generating PHY output data units by performing PHY layer processing of the MAC output data units, wherein selected PHY output data units are generated from the selected MAC output data units for transmission to the second communication device from the first communication device in coordination with the transmission of selected PHY output data units generated by the third communication device from the selected MAC output data units, wherein the coordination comprises a joint transmission of the selected PHY output data units at the same time from both the first communication device and the third communication device, combining the selected MAC output data units and the control information to form a multi-access point MAC service data unit (MAP-MSDU), wherein the control information includes at least PHY configuration information and an identifier; and providing the MAP-MSDU to the third communication device at a MAC protocol data unit (MPDU) or aggregated MPDU (A-MPDU) level rather than at a physical protocol data unit (PPDU) level;

wherein the first communication device is configured to provide the one or more selected MAC output data units along with the control information to an external entity different from the third communication device to enable the external entity to provide the one or more selected MAC output data units to the third communication device according to the control information.

* * * * *